(12) United States Patent
Curlander et al.

(10) Patent No.: US 10,554,950 B1
(45) Date of Patent: Feb. 4, 2020

(54) COLLECTION OF CAMERA CALIBRATION DATA USING AUGMENTED REALITY

(71) Applicant: Amazon Technologies, Inc., Seattle, WA (US)

(72) Inventors: James Christopher Curlander, Bellevue, WA (US); Gur Kimchi, Bellevue, WA (US); Barry James O'Brien, Seattle, WA (US); Jason Leonard Peacock, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 329 days.

(21) Appl. No.: 15/461,227

(22) Filed: Mar. 16, 2017

(51) Int. Cl.
*H04N 13/246* (2018.01)
*G06T 19/00* (2011.01)
*B64C 39/02* (2006.01)
*B64D 47/08* (2006.01)
*H04N 13/332* (2018.01)

(52) U.S. Cl.
CPC ......... *H04N 13/246* (2018.05); *B64C 39/024* (2013.01); *B64D 47/08* (2013.01); *G06T 19/006* (2013.01); *H04N 13/332* (2018.05); *B64C 2201/127* (2013.01)

(58) Field of Classification Search
None
See application file for complete search history.

(56) References Cited

U.S. PATENT DOCUMENTS

| | | | |
|---|---|---|---|
| 9,201,424 B1 | 12/2015 | Ogale | |
| 9,541,633 B2 | 1/2017 | Rybski | |
| 9,612,598 B2 * | 4/2017 | Schultz | B64D 47/08 |
| 9,986,233 B1 | 5/2018 | Curlander et al. | |
| 2011/0122257 A1 | 5/2011 | Kirk et al. | |
| 2012/0050524 A1 | 3/2012 | Rinner et al. | |
| 2014/0267777 A1* | 9/2014 | Le Clerc | G03B 15/006 |
| | | | 348/169 |
| 2014/0362186 A1 | 12/2014 | Ji et al. | |
| 2014/0371952 A1 | 12/2014 | Ohtomo et al. | |
| 2015/0348329 A1* | 12/2015 | Carre | G06Q 30/02 |
| | | | 345/633 |
| 2016/0068267 A1 | 3/2016 | Liu et al. | |
| 2016/0182903 A1 | 6/2016 | Grundhofer | |

(Continued)

OTHER PUBLICATIONS

U.S. Appl. No. 15/461,287, U.S. Patent Application, filed Mar. 16, 2017, Titled: Validation of Camera Calibration Data Using Augmented Reality.

(Continued)

*Primary Examiner* — Dave Czekaj
*Assistant Examiner* — Shanika M Brumfield
(74) *Attorney, Agent, or Firm* — Kilpatrick Townsend & Stockton LLP

(57) ABSTRACT

Methods and systems for collecting camera calibration data using wearable devices are described. An augmented reality interface may be provided at a wearable device. Three-dimensional virtual information may be presented at the augmented reality interface. The three-dimensional information may identify a field of view of a remote camera and may be associated with collection of calibration data for the remote camera. Calibration data collected by the remote camera viewing a calibration target in the field of view may be received. The camera may be calibrated based at least in part on the calibration data.

20 Claims, 22 Drawing Sheets

(56) References Cited

U.S. PATENT DOCUMENTS

| | | |
|---|---|---|
| 2016/0284075 A1 | 9/2016 | Phan et al. |
| 2017/0147180 A1 | 5/2017 | Yoon et al. |
| 2017/0221226 A1 | 8/2017 | Shen et al. |
| 2017/0278365 A1* | 9/2017 | Madar .................. G06K 7/1092 |
| 2018/0042681 A1* | 2/2018 | Jagga ..................... A61B 34/20 |
| 2018/0047184 A1* | 2/2018 | Uchiyama ................ G06T 7/80 |
| 2018/0149138 A1 | 5/2018 | Thiercelin et al. |
| 2018/0158197 A1* | 6/2018 | Dasgupta ............. G05D 1/0094 |
| 2018/0239350 A1 | 8/2018 | Cantrell |
| 2018/0249142 A1 | 8/2018 | Hicks et al. |
| 2018/0267543 A1 | 9/2018 | Mcguire et al. |
| 2018/0361595 A1 | 12/2018 | Troy et al. |
| 2019/0000412 A1 | 1/2019 | Wong et al. |

OTHER PUBLICATIONS

U.S. Appl. No. 15/461,335, U.S. Patent Application, filed Mar. 16, 2017, Titled: Camera Calibration Using Fixed Calibration Targets.

* cited by examiner

COLLECTION OF CAMERA CALIBRATION DATA USING AUGMENTED REALITY

CROSS REFERENCE TO RELATED APPLICATIONS

This application is related to copending U.S. application Ser. No. 15/461,287, filed Mar. 16, 2017, entitled "VALIDATION OF CAMERA CALIBRATION DATA USING AUGMENTED REALITY", and U.S. application Ser. No. 15/461,335 filed Mar. 16, 2017, issued as U.S. Pat. No. 9,986,233 on May 29, 2018, and entitled "CAMERA CALIBRATION USING FIXED CALIBRATION TARGETS", the contents of which are herein incorporated in their entirety.

BACKGROUND

Cameras may be used as part of a navigational system of a vehicle. When initially installed on the vehicle, the cameras can be calibrated. This may include adjusting internal parameters of the camera based on objects in a scene and correspondences between the objects. The cameras may be sensitive to small position errors, which may be caused by normal stresses on the vehicle, thermal changes to the vehicle or the cameras, jostling of the vehicle or the cameras, and other similar causes. Because of this, the cameras may require periodic recalibration. If not, output from the cameras may be unreliable.

BRIEF DESCRIPTION OF THE DRAWINGS

Various examples in accordance with the present disclosure will be described with reference to the drawings, in which.

DETAILED DESCRIPTION

Figure 1:
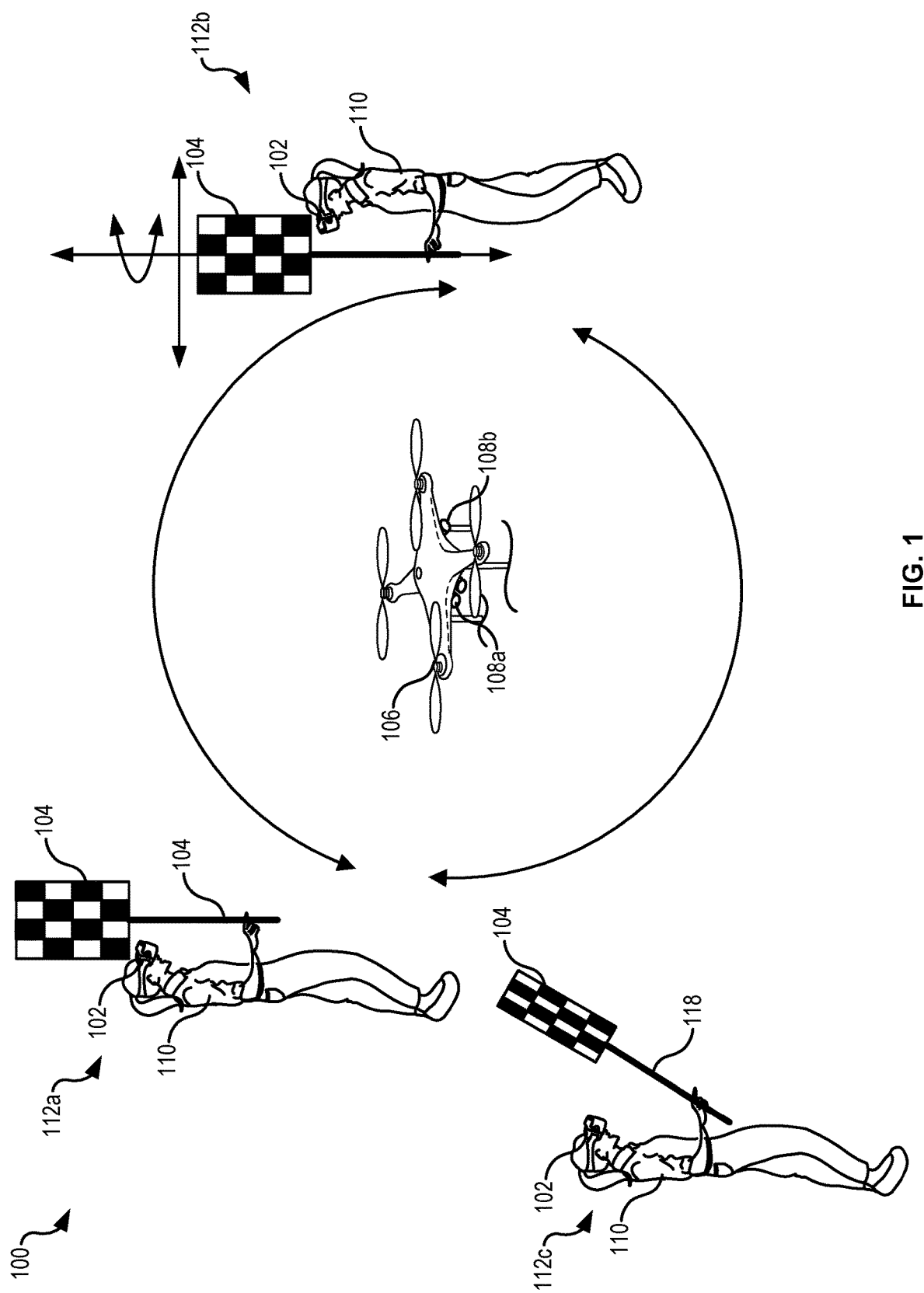
FIG. 1 illustrates an example environment for implementing techniques relating to camera calibration using a wearable head-mounted device and a moveable calibration target, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well known features may be omitted or simplified in order not to obscure the example being described.

Examples herein are directed to, among other things, systems and techniques relating to gathering calibration data usable for calibrating cameras. The techniques described herein may be implemented to calibrate any suitable camera, but particular examples are described that include cameras attached to a vehicle such as an unmanned aerial vehicle. The cameras may be part of a sense-and-avoid system, navigational system, or any other suitable system of the unmanned aerial vehicle that relies on information gathered by the cameras. The techniques described herein may be implemented at any suitable time during the service life of the cameras (e.g., for initial calibration when the cameras are first attached to the unmanned aerial vehicle and for any later recalibrations that may be required during operation of the unmanned aerial vehicle). The techniques described herein may include automation of portions of a calibration process previously performed manually, reduction of time required for performance of the calibration process, reduction of human operators required for performance of the calibration process, and/or increased fidelity of the data collected for calibration.

Turning now to a particular example, in this example, data usable to calibrate a set of cameras of an unmanned aerial vehicle is collected using a wearable device and a moveable calibration target. The wearable device may be mounted on a person's head and may be configured to provide an augmented reality. This may include the presentation of virtual information such as holograms on a transparent display of the wearable device such that the virtual information is visible along with physical objects of the physical environment. With respect to gathering calibration data for the set of cameras, the virtual information may include virtual indicia that identify where, with respect to the set of cameras, calibration data for the set of cameras should be collected. For example, these indicia may represent instructions of where a wearer (e.g., general area, position and orientation, etc.) of the wearable device should move the moveable calibration target with respect to the cameras to collect the calibration data. As the wearer moves the calibration target with respect to the cameras and presents the calibration target to the cameras, the virtual indicia may be adjusted to indicate that sufficient calibration data has been gathered (e.g., change from a red point cloud to a green point cloud). The calibration data may then be used to calibrate the set of cameras using any suitable camera calibration technique.

Turning now to another particular example, in this example, an existing calibration of a set of cameras of an unmanned aerial vehicle is validated using data collected using a wearable device. The wearable device may be mounted on a person's head and may be configured to provide for an augmented reality. This may include the presentation of virtual information on a transparent display of the wearable device such that the virtual information is visible along with physical objects of the physical environment. With respect to gathering calibration data for validating the existing calibrations, the virtual information may include virtual indicia that identify which cameras of the set of cameras need calibration data. For example, virtual arrows or flags presented on the transparent display may identify one of the cameras. This may alert the wearer to present a calibration target to the camera. In this example, the calibration target may be integrated into the wearable device (e.g., a pattern formed on a front portion of the wearable device). This may enable the wearer to have her hands free during the calibration data collection process. For example, the calibration data may be collected while the wearer performs other tasks relating to the unmanned aerial vehicle such as a manual preflight inspection of the unmanned aerial vehicle. In this example, the calibration data may be collected with little to no virtual information presented at the display. For example, as part of the preflight inspection, the wearer may present the calibration target to the cameras, even if the wearer is not explicitly instructed to do so via the virtual indicia. Thus, the process for collecting the calibration data may be performed in the background as the wearer performs the preflight inspection or otherwise approaches the unmanned aerial vehicle. The calibration data may then be used to validate the set of cameras using any suitable camera calibration technique.

Turning now to yet another particular example, in this example, calibration data for a set of cameras of an unmanned aerial vehicle may be collected while the unmanned aerial vehicle moves with respect to a set of fixed calibration targets. Thus, unlike in the previous examples, in this example, the calibration targets are fixed and the unmanned aerial vehicle moves with respect to the calibration targets so that the cameras can view the calibration targets. Given information about the cameras (e.g., position of the cameras, orientation of the cameras, and relationship of the cameras with respect to each other) and information about the fixed targets (e.g., location, orientation, size, and other details), a flight plan for the unmanned aerial vehicle may be computed. This flight plan includes directions for the unmanned aerial vehicle to follow in order to present the cameras to the fixed calibration targets at the appropriate distances and in the appropriate orientations. The unmanned aerial vehicle may then autonomously follow the flight plan to automatically gather the calibration data. The calibration data can be used to calibrate the cameras using any suitable camera calibration technique. The camera calibration technique may be performed in real time as the calibration data is collected. When needed for calibration, the flight plan may be adjusted and/or augmented to gather additional calibration data.

Turning now to the figures, FIG. 1 illustrates an example environment 100 for implementing techniques relating to camera calibration using a wearable head-mounted device 102 and a moveable calibration target 104, according to at least one example. As described herein, the wearable head-mounted device 102 may be any suitable augmented reality headset that includes a transparent display on which can be presented an augmented reality interface. In the environment 100, calibration data may be collected for performing a calibration of cameras 108a-108N of an aerial vehicle 106 (e.g., 108a and 108b are illustrated). A user 110 wearing the wearable head-mounted device 102 and holding the moveable calibration target 104 moves the calibration target 104 with respect to the aerial vehicle 106. Hence, in this example, the aerial vehicle 106 and the cameras 108 are all stationary. For example, the aerial vehicle 106 may be held in a support frame, may rest on a platform or the ground, or may be held or supported in any other manner (e.g., may hang from a frame). The calibration target 104 may be any arrangement of lines and shapes that is known to the cameras 108. Such arrangements may include repeating patterns (e.g., checker boxes), non-repeating patterns (e.g., two dimensional barcodes such as QR codes and other matrix barcodes), and any other suitable arrangement of lines and shapes. The calibration target 104 can be a handheld object (e.g., Rubik's cube, poster board sign, etc.). In some examples, the calibration target 104 can include a pole, straps, handholds, or other structures to enable mobility of the calibration target 102 by the user 110.

At the wearable head-mounted device 102 may be presented virtual information relating to the collection of calibration data. For example, the virtual information may constitute directions for how the user 110 should move herself and the calibration target 104 with respect to the cameras 108 in order to collect sufficient calibration data. The directions may represent particular areas (e.g., positions and orientations) with respect to the cameras 108 where the calibration target 104 should be located to collect calibration data. The directions may also represent particular movements of the calibration target 104 when located in the particular areas (e.g., move left, move right, move to this position, and other similar movements). For example, in the environment 100, the user 110 is illustrated at three different areas 112a-112c with respect to the cameras 108. The user 110 may move to the different areas 112 and to other areas with respect to the cameras 108 as instructed via the wearable head-mounted device 102. At any location surrounding the aerial vehicle 106, the user 110 may manipulate a position and an orientation of the calibration target 104 with respect to the cameras 108. This may include moving the calibration target 104 up and down, tilting side to side, tilting forward and backward, rotating along any axis, and performing any other suitable movement. At the wearable head-mounted device 102, the user 110 may be provided with feedback regarding collection of the calibration data. For example, as the calibration data is collected, the user 110 may see the virtual information in the wearable head-mounted device 102 change from a first state indicating insufficient calibration data (e.g., red) to a second state indicating sufficient calibration data (e.g., green).

FIGS. 2, 6, 10, 16, 17, 18, 19, 20, and 21 illustrate example flow diagrams showing respective processes 200, 600, 1000, 1600, 1700, 1800, 1900, 2000, and 2100, as described herein. These processes 200, 600, 1000, 1600, 1700, 1800, 1900, 2000, and 2100 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 2:
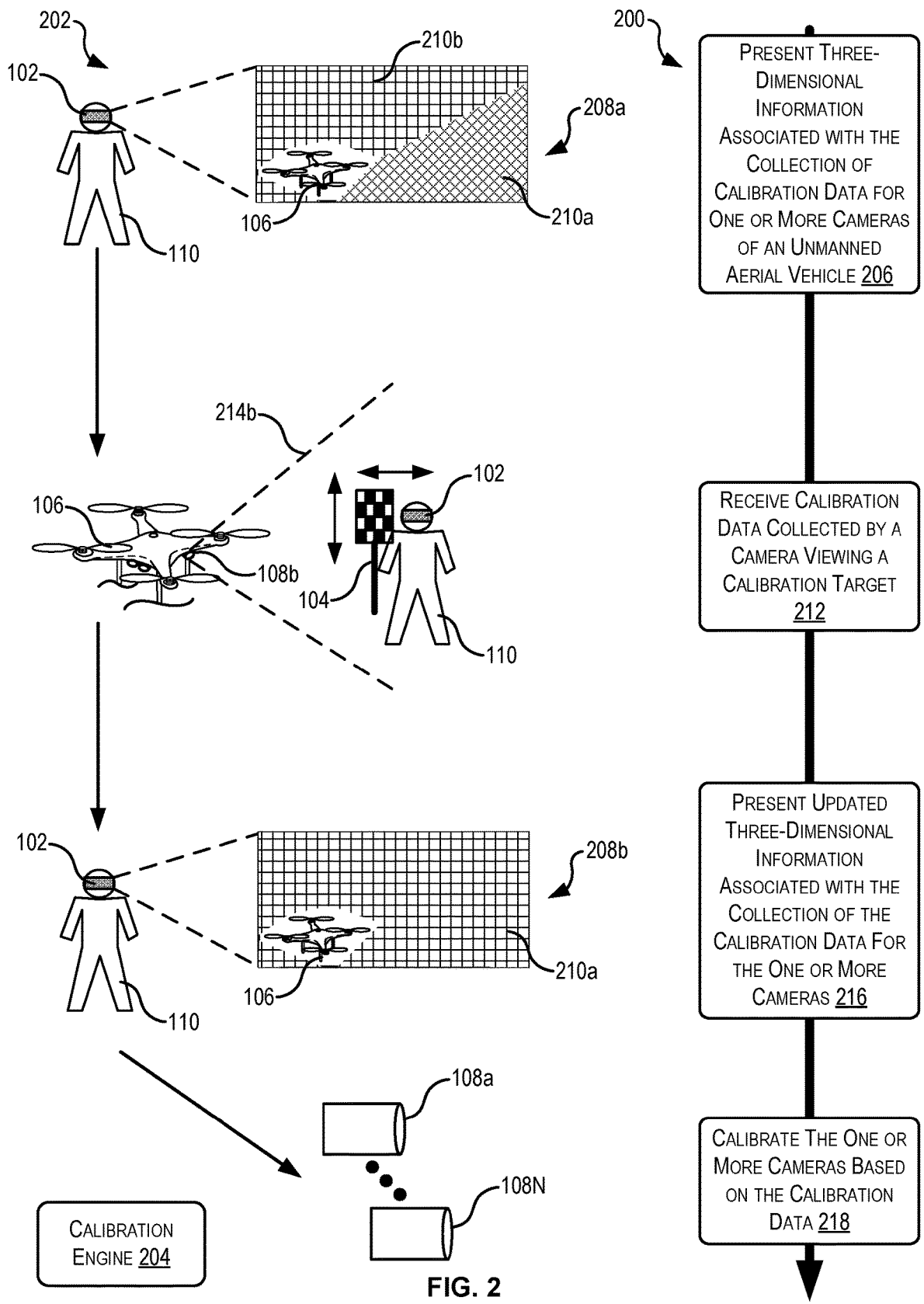
FIG. 2 illustrates an example flow diagram depicting example acts and corresponding illustrations for implementing techniques relating to camera calibration using a wearable head-mounted device and a moveable calibration target, according to at least one example.

FIG. 2 illustrates an example flow diagram depicting example process 200 and corresponding illustrations 202 for implementing techniques relating to camera calibration using the wearable head-mounted device 102 and the moveable calibration target 104, according to at least one example. The process 200 may be performed at least in part by a calibration engine 204. As described in detail herein, the calibration engine 204 may be any suitable software and/or hardware component configured to implement the techniques described herein. For example, the calibration engine 204 may be a software module executed by a computer system in communication with the wearable head-mounted device 102 and the aerial vehicle 106.

The process 200 may begin at 206 by presenting three-dimensional information 210 associated with the collection of calibration data for one or more cameras 108 of the aerial vehicle 106. This may include presenting the three-dimensional information 210, via an augmented reality interface 208, which is presented at a transparent display of the wearable head-mounted device 102. A view 208a of the augmented reality interface 208 is illustrated as corresponding to 206. The view 208a is a representation of what the user 110 would see when looking through the transparent display of the wearable head-mounted device 102. In this example, the view 208a may include first three-dimensional information 210a and second three-dimensional information 210b, both of which are types of virtual information, and the aerial vehicle 106, which is a physical object. In the view 208a, because the user 110 is gazing in the direction of the aerial vehicle 106, the aerial vehicle 106 is visible through the transparent display together with the three-dimensional information 210. The three-dimensional information 210 may represent different characteristics relating to collecting calibration data. For example, the three-dimensional information 210a may represent an area surrounding the cameras 108 of the aerial vehicle 106 where insufficient calibration data has been collected. Likewise, the three-dimensional information 210b may represent areas surrounding the cameras 108 where sufficient calibration data has been collected. In this manner, the three-dimensional information 210 may represent instructions or directions for the user 110 to move toward to the three-dimensional area represented by the three-dimensional information 210b such that additional calibration data can be collected.

At 212, the process 200 may receive calibration data collected by the camera 108b viewing the calibration target 104. The camera 108b may view the calibration target 104 after the user 110 has moved the calibration target 104 into the area represented by the three-dimensional information 210b. This area may be within a field of view 214b of the camera 108b. The field of view 214b may be a three-dimensional area that is visible to the camera 108b.

Generally, calibration data may be collected as one or more cameras 108 capture images of the calibration target 104 at different positions and orientations with respect to the cameras 108. Thus, in this example, the user 110 may move the calibration target 104 and/or herself in any suitable manner in order to present the calibration target 104 to the camera 108b.

At 216, the process 200 may present updated three-dimensional information 210 associated with the collection of the calibration data for the one or more cameras 108. This may include presenting the three-dimensional information 210, as depicted in the view 208b. The view 208a is a representation of what the user 110 would see when looking through the transparent display of the wearable head-mounted device 102 after presenting the calibration target 104 to the camera 108*b*. In this example, the view 208*b* may include only first three-dimensional information 210*a*. This may be because, at least with respect to the present view, sufficient calibration data has been collected for the camera 108*b*. In this manner, the user 110 may be instructed relating to collection of calibration data. The calibration engine 204 may provide for real-time tracking of what data points the camera 108 has collected (e.g., at 212) and update the augmented reality interface 208 accordingly.

In some examples, the collection of calibration data is specific to a particular camera or to a set of cameras. For example, instructions may be provided for collecting calibration data for a single camera at a time. After calibration data for a first camera has been collected, instructions for collection calibration data for a second camera may then be provided, and so on and so forth until calibration data for all cameras has been collected. As an additional example, calibration data may be collected for all cameras, or a subset of more than one camera, at the same time.

At 218, the process 200 calibrates the one or more cameras 108 based on the calibration data. The calibration data was collected at 212 as the user 110 moved herself and the calibration target 104. Calibrating the cameras 108 may include using any suitable calibration technique using calibration targets (e.g., two-dimensional, three-dimensional, etc.) with patterns and/or features of known size and/or orientation for calibrating one camera, stereo cameras, or a set of cameras including more than one camera. Such calibration techniques may include movement of a calibration target through a field of view of a camera. In this example, because the calibration target is smaller than the field of view of the camera at a given distance, the calibration target is moved throughout the field of view of the camera and uses multiple images to get feature points covering the entire field of view. Such calibration techniques may also include a single shot of a fixed calibration target. In this example, because the calibration target fills the entire field of view of a camera at a given distance, a single image can be captured to provide suitable feature points. Such calibration techniques may also include camera movement with respect to a fixed target. In this example, a camera is moved in space relative to the fixed target. Multiple images are captured of the calibration target, with each image putting the target in a different position in the field of view of the camera and/or capturing the target from a different orientation.

Figure 3:
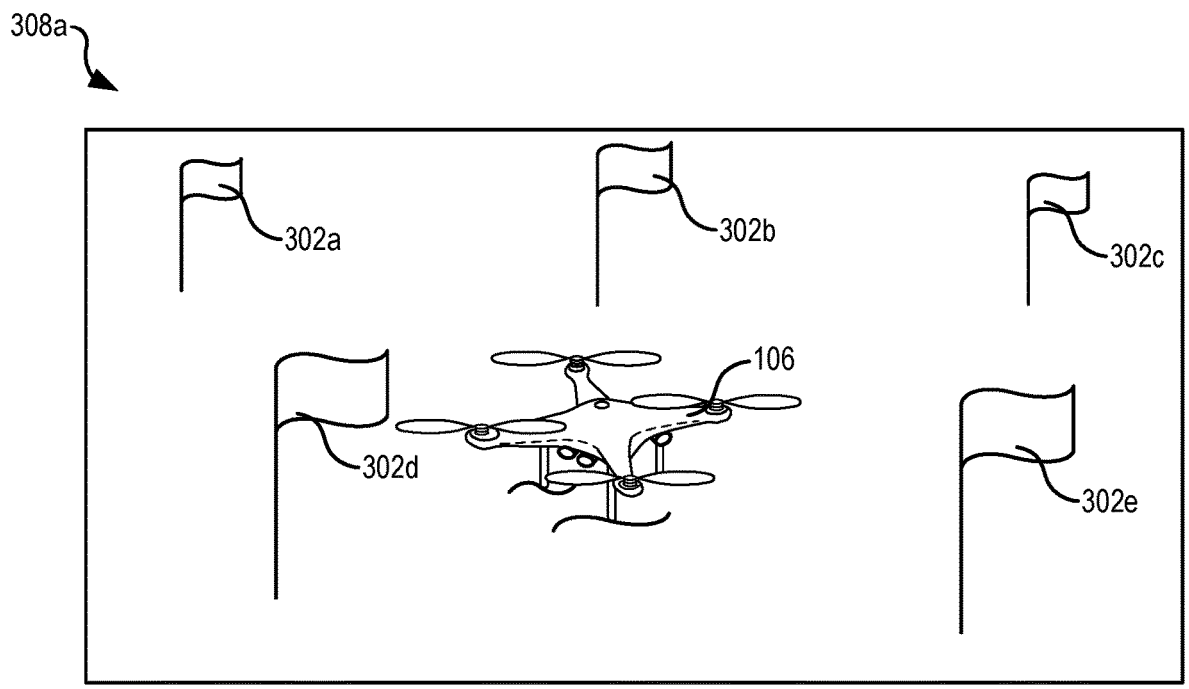
FIG. 3 illustrates example views in a display of a wearable head-mounted device relating to camera calibration using the wearable head-mounted device and a moveable calibration target, according to at least one example.
Figure 3:
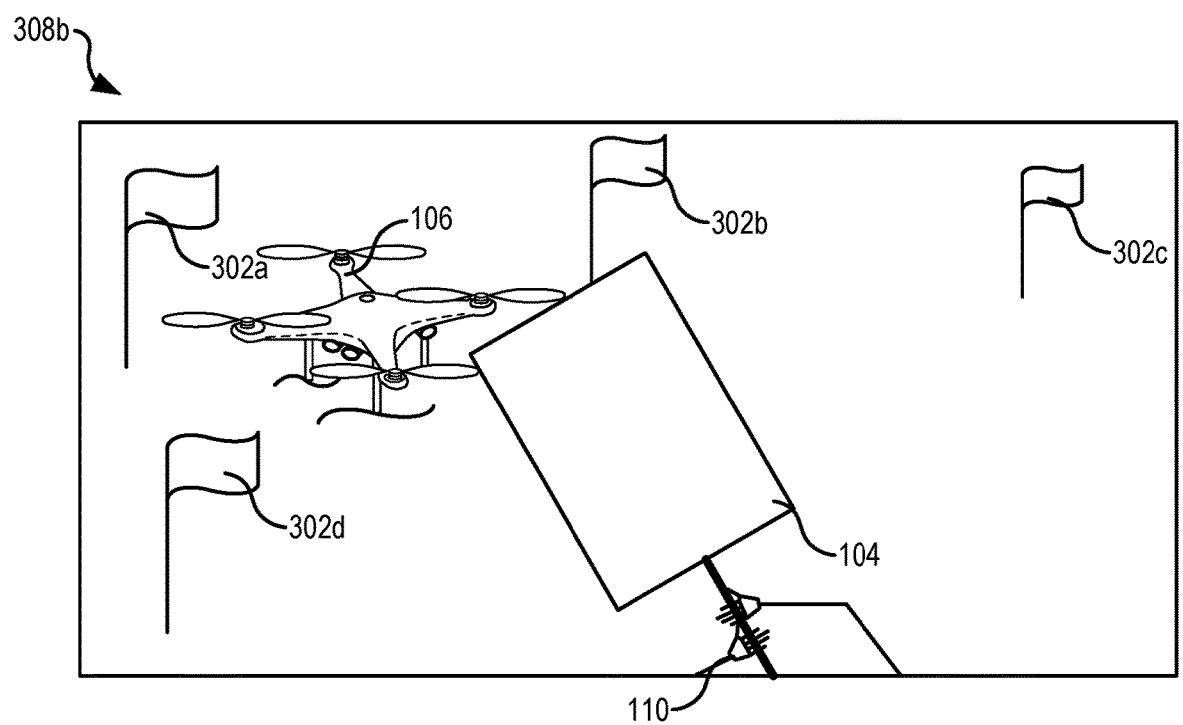

FIG. 3 illustrates example views 308 of an augmented reality interface of the wearable head-mounted device 102 relating to camera calibration using the wearable head-mounted device 102 and the moveable calibration target 104, according to at least one example. The view 308*a* includes virtual information in the form of a set of three-dimensional flags 302*a*-302*e* and a physical object, the aerial vehicle 106. The three-dimensional flags 302 may indicate areas with respect to the aerial vehicle 106 for collection of calibration data. To collect the calibration data, the user 110 may walk to the areas in the physical environment identified by the three-dimensional flags 302 and present the calibration target 104 toward the aerial vehicle 106. As the aerial vehicle 106 may include cameras 108 disposed radially about itself, the three-dimensional flags 302 may likewise be disposed radially about the aerial vehicle 106. The three-dimensional flags 302 may appear to be sized differently because some are closer to the user 110 (e.g., the three-dimensional flags 302*d*, 302*d*) and some are further away (e.g., 302*a*, 302*b*, and 302*c*). In some examples, the three-dimensional flags 302 are uniformly distributed about the aerial vehicle 106. In other examples, the distribution is non-uniform, including various distances from the aerial vehicle 106.

The view 308*b* includes the three-dimensional flags 302*a*-302*d* and the aerial vehicle 106 from a different perspective than represented in the view 308*a*. In the view 308*b*, the user 110 has moved to an area in the physical environment that was identified by the three-dimensional flag 302*e* in the view 308*a*. For example, while wearing the wearable head-mounted device 102, the user 110 may be directed to walk the area in the physical environment identified by the three-dimensional flag 302*e* in a virtual environment. In some examples, the properties of the three-dimensional flag 302*e* or additional virtual information may be presented in the view 308 (e.g., 308*a*, 308*b*, or any view presented at a time in between the two views) that grabs the user's 110 attention and directs the user 110 to the three-dimensional flag 302*e*. For example, the three-dimensional flag 302*e* may have a first color that is different than the other three-dimensional flags 302. Arrows, ordinal numerals, words, and other such indicators may also be used to attract the user's 110 attention to one or more of the three-dimensional flags 302.

While at the area associated with the three-dimensional flag 302*e*, the user 110—holding the calibration target 104—may present the calibration target 104 to the aerial vehicle 106 in the manner described herein. Additionally, while at the area associated with the three-dimensional flag 302*e*, additional virtual information may be presented in the virtual environment that directs the user 110 to adjust the calibration target 104 to gather the calibration data. Once sufficient calibration data has been gathered in the area associated with the three-dimensional flag 302*e*, the user 110 may, on her own, select a next three-dimensional flag 302 or virtual information may be presented that identifies the next flag. In any event, the user 110 may continue to move between the three-dimensional flags 302 with the calibration target 104 to collect the calibration data.

In some examples, the three-dimensional information that may presented at the augmented reality interface of the wearable head-mounted device 102 may include ghost versions of the calibration target 104. For example, a ghost version of the calibration target 104 may include a three-dimensional representation of the calibration target 104 at some location in the physical environment. The ghost versions can function as directions for how to the user 110 is to move the calibration target 104. For example, a particular ghost version may include a grayed-out three-dimensional outline of the calibration target 104. To obtain the calibration data associated with the area surrounding the particular ghost version may require the user 110 to align the calibration target 104 with the particular ghost version. Once the alignment has been completed and the calibration data has been collected, a state of the particular ghost version may change. For example, the gray-out three-dimensional outline may change to a colored depiction of the calibration target indicating to the user 110 that sufficient calibration data in this area has been collected. Other ghost versions may be presented at other physical locations with respect to the aerial vehicle 106 to indicate to the user 110 other locations where calibration data is needed.

Figure 4:
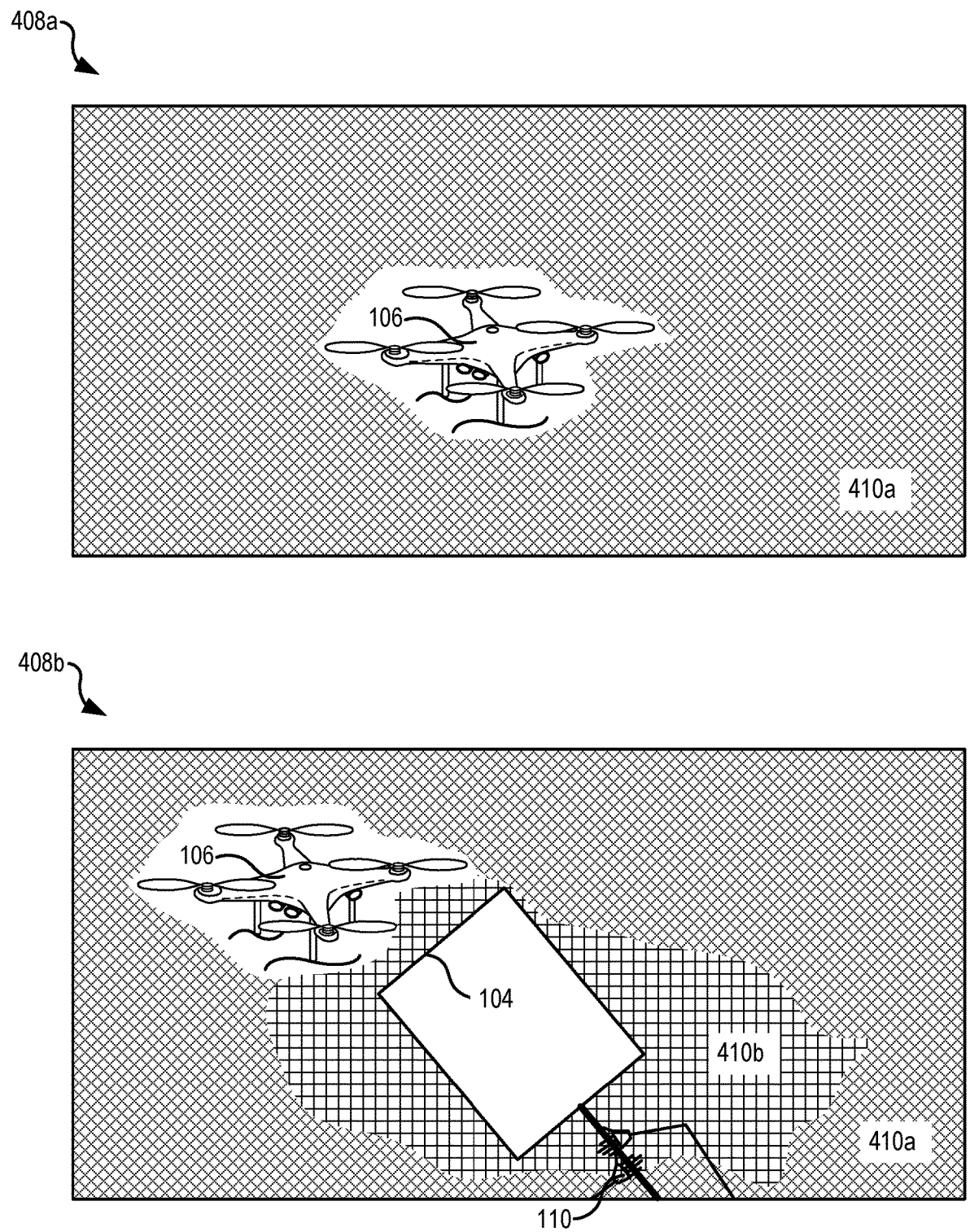
FIG. 4 illustrates example views in a display of a wearable head-mounted device relating to camera calibration using the wearable head-mounted device and a moveable calibration target, according to at least one example.

FIG. 4 illustrates example views 408 of an augmented reality interface of the wearable head-mounted device 102 relating to camera calibration using the wearable head-mounted device 102 and the moveable calibration target 104, according to at least one example. In the views 408, virtual information is presented in the form of a point cloud. In particular, the view 408*a* includes unsatisfied point cloud indicia 410*a* and a physical object, the aerial vehicle 106. The view 408*b* includes some of the unsatisfied point cloud indicia 410*a*, satisfied point cloud indicia 410*b*, the aerial vehicle 106, and the calibration target 104. Similar to the views 308 discussed with reference to FIG. 3, the view 408*a* may represent a view of the physical environment in which the aerial vehicle 106 is located, with virtual information (e.g., the unsatisfied point cloud indicia 410*a*) layered on top of the physical environment. The unsatisfied point cloud indicia 410*a* may be "unsatisfied" in the sense that insufficient calibration data has been collected from the physical areas represented by the unsatisfied point cloud indicia 410*a*. With this understanding, the user 110 may be free to move about the aerial vehicle 106 collecting calibration data within the physical areas represented by the unsatisfied point cloud indicia 410*a*. Once sufficient calibration data for one of the these areas has been collected by the cameras 108 and processed by the system, the point cloud indicia 410 corresponding to that area may change from unsatisfied to satisfied (e.g., in the sense that sufficient calibration data has been collected for the area represented by the indicia). The view 408*b* illustrates a similar situation where a portion of the point cloud has been satisfied. In the view 408*b*, the user 110 has presented the calibration target 104 to the aerial vehicle 106 for some time. During this time, sufficient calibration data was collected by the cameras 108 of the aerial vehicle 106 and the system has changed the point cloud indicia 410 in the area around the calibration target 104 and the user 110. For example, this change may include a change in one or more properties (e.g., color, visibility, shape, intrusiveness, contrast, flashing, etc.) of the point cloud indicia 410. In this manner, the user 110 may be informed about the user's 110 progress in collecting the calibration data.

Figure 5:
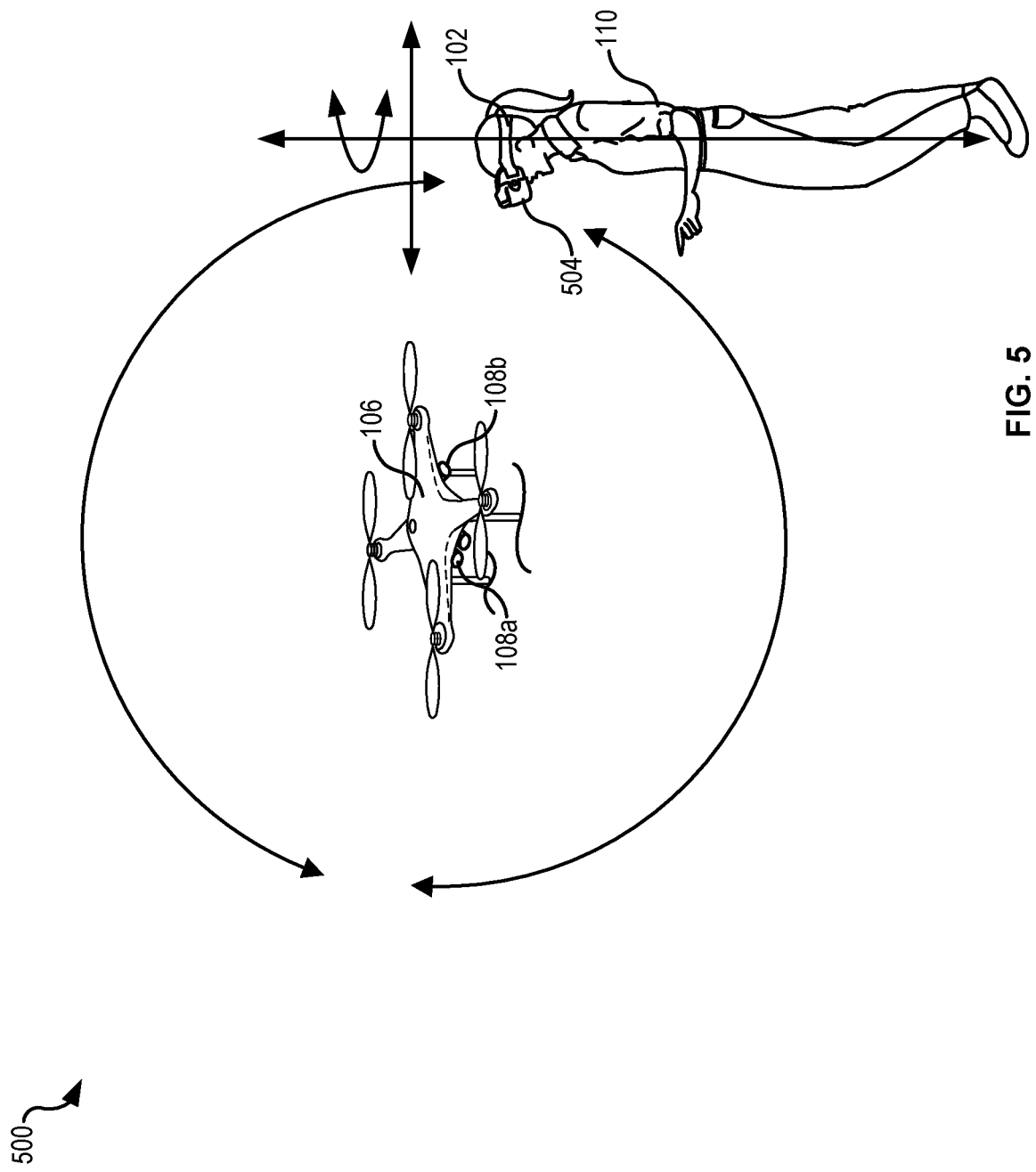
FIG. 5 illustrates an example environment for implementing techniques relating to camera calibration using a wearable head-mounted device and a moveable calibration target, according to at least one example.

FIG. 5 illustrates an example environment 500 for implementing techniques relating to camera calibration using the wearable head-mounted device 102 and an attached calibration target 504, according to at least one example. Like the environment 100, in the environment 500, the user 110 is free to move about the aerial vehicle 106 and present the attached calibration target 502 to the cameras 108. The attached calibration target 504 in this example is attached to the user 110 and/or the wearable head-mounted device 102. For example, instead of being a separate structure like the moveable calibration target 104, the attached calibration target 504 may be integrated into a portion of the wearable head-mounted device 102. For example, as discussed with reference to FIG. 15, the attached calibration target 504 may be attached to a front portion of the wearable head-mounted device 102 (e.g., near the display). In some examples, the attached calibration target 504 may represent a smaller area than the moveable calibration target 104. In this manner, the attached calibration target 504 may be suitable for validating existing calibration data and/or an existing camera calibration, while the moveable calibration target 104 may be more suitable for calibrations where more data points may be required.

In some examples, the virtual information presented at the wearable head-mounted device 102 directs the user 110 to move about the aerial vehicle 106 to perform the calibration validation. In some examples, the user 110 is instructed to perform other tasks with respect to the aerial vehicle 106 such as a preflight inspection, loading of a payload, and other similar tasks. While the user 110 is performing these tasks, it is likely that the user 110 will nevertheless present the attached calibration target 504 in the direction of the cameras 108. The cameras 108 may be searching for the attached calibration target 504, and when detected, may collect the calibration data required. Thus, in this example, the collection of calibration data may function essentially as background process while the user 110 is directed at the wearable head-mounted device 102 to perform other tasks. If insufficient calibration data is collected during performance of the other tasks, explicit instructions may be presented at the wearable head-mounted device 102 that inform the user 110 where additional calibration data is required. This may include simply identifying which camera 108 is using virtual information. As illustrated, the user 110 may move in any suitable direction with respect to the aerial vehicle 106 in order to gather the calibration data. Once a sufficient amount of calibration data has been collected, the existing calibration data and/or calibrations of the cameras 108 may be validated.

Figure 6:
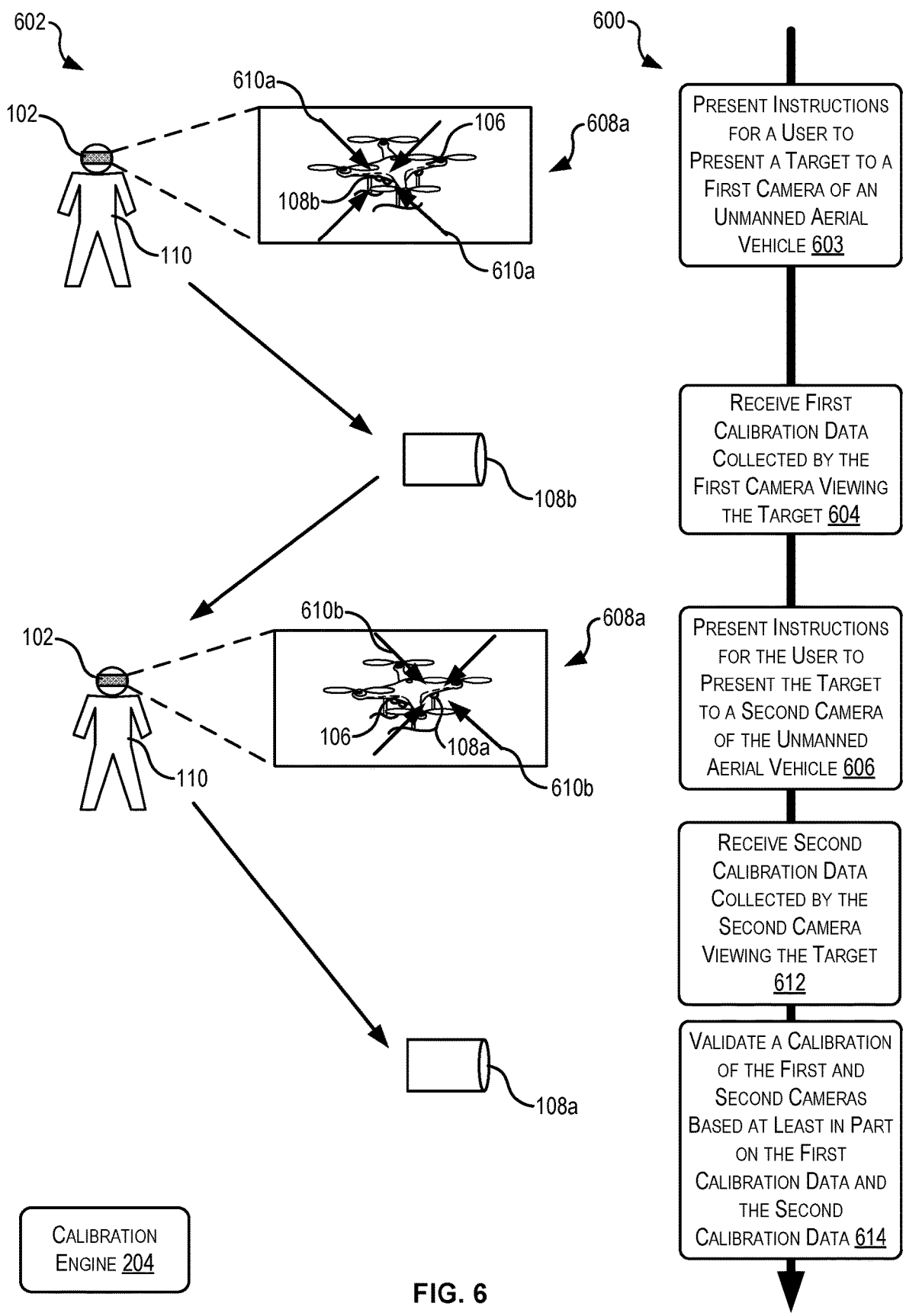
FIG. 6 illustrates an example flow diagram depicting example acts and corresponding illustrations for implementing techniques relating to camera calibration using a wearable head-mounted device and a moveable calibration target, according to at least one example.

FIG. 6 illustrates an example flow diagram depicting example process 600 and corresponding illustrations 602 for implementing techniques relating to camera calibration using the wearable head-mounted device 102 and the attached calibration target 504, according to at least one example. The process 600 may be performed at least in part by the calibration engine 204. As described in detail herein, the calibration engine 204 may be any suitable software and/or hardware component configured to implement the techniques described herein. For example, the calibration engine 204 may be a software module executed by a computer system in communication with the wearable head-mounted device 102 and the aerial vehicle 106.

The process 600 may begin at 603 by presenting instructions for the user 110 to present a target (e.g., the attached calibration target 504) to a first camera (e.g., the camera 108*b*) of the aerial vehicle 106. This may include presenting the instructions as three-dimensional information 610, via an augmented reality interface, which is presented at a transparent display of the wearable head-mounted device 102. A view 608*a* is an example view of such an interface and is illustrated as corresponding to 603. The view 608*a* is a representation of what the user 110 would see when looking through the transparent display of the wearable head-mounted device 102. In this example, the view 608*a* may include first three-dimensional information 610*a* and the aerial vehicle 106, which is a physical object. The three-dimensional information 610*a* may identify the camera 108*b* that is mounted to the aerial vehicle 106. For example, the three-dimensional information 610*a* may include a set of flashing arrows pointing at the camera 108*b*. Any other suitable three-dimensional information may be included in place of or in addition to the set of flashing arrows. The purpose of the three-dimensional information 610*a* is to instruct the user 110 to present the attached calibration target 504 to the camera 108*b*. Presenting the attached calibration target 504 may allow the camera to capture one or more images of the attached calibration target 504 that are usable as calibration data for the camera 108*b*.

At 604, the process 600 receives first calibration data collected by the first camera (e.g., the camera 108*a*) viewing the target (e.g., the attached calibration target 504). The first calibration data may be collected from the camera 108*b* after the camera 108*b* has viewed the attached calibration target 504.

At 606, the process 600 presents instructions for the user 110 to present the target (e.g., the attached calibration target 504) to a second camera (e.g., the camera 108*a*) of the aerial vehicle 106. This may include presenting the instructions as three-dimensional information 610b. The view 608b is a representation of what the user 110 would see when looking through the transparent display of the wearable head-mounted device 102 at or around the time 606 is executed. In this example, the view 608b may include second three-dimensional information 610b and the aerial vehicle 106. The three-dimensional information 610b may identify the camera 108b that is mounted to the aerial vehicle 106. For example, like the three-dimensional information 610a, the three-dimensional information 610b may include a set of flashing arrows pointing at the camera 108a. Any other suitable three-dimensional information may be included in place of or in addition to the set of flashing arrows. The purpose of the three-dimensional information 610b is to instruct the user 110 to present the attached calibration target 504 to the camera 108a. Presenting the attached calibration target 504 may allow the camera to capture one or more images of the attached calibration target 504 that are usable as calibration data for the camera 108a.

At 612, the process 600 receives second calibration data collected by the second camera (e.g., the camera 108b) viewing the target (e.g., the attached calibration target 504). The second calibration data may be collected from the camera 108a after the camera 108a has viewed the attached calibration target 504.

At 614, the process 600 validates a calibration of the first and second cameras (e.g., the cameras 108a, 108b) based at least in part on the first calibration data and the second calibration data. For example, the cameras 108a, 108b may be a set of stereo cameras and validating the calibration may include confirming that the attached calibration target 504 is visible at the same position in output from each camera 108a, 108b. In some examples, the first and second calibration data may include far fewer data points than the calibration data collected and used in other examples described herein. Validating the calibration may be performed using any suitable calibration technique.

Figure 7:
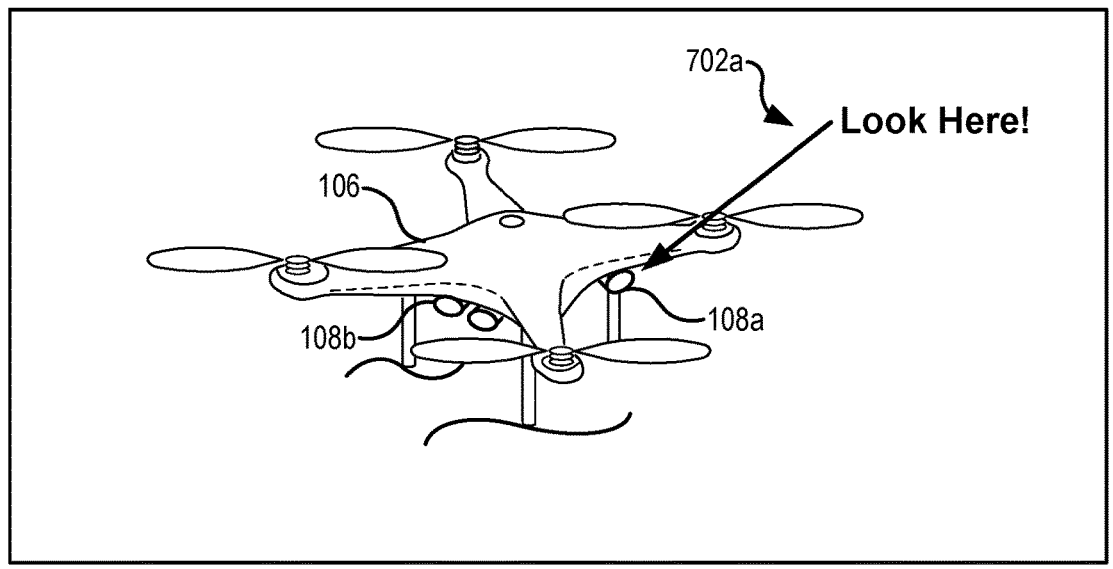
FIG. 7 illustrates example views in a display of a wearable head-mounted device relating to camera calibration using the wearable head-mounted device and a moveable calibration target, according to at least one example.
Figure 7:
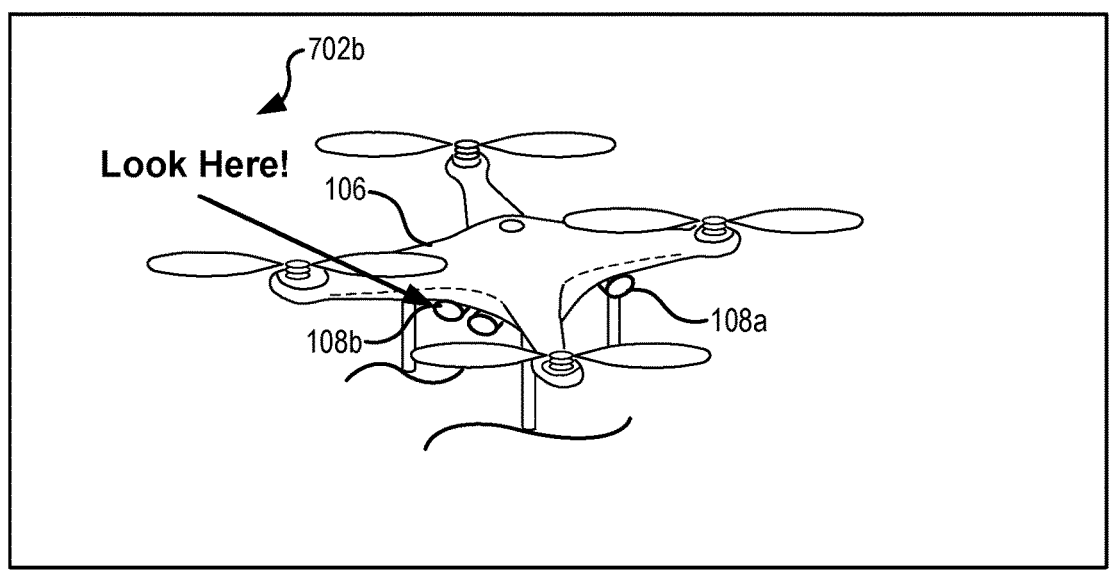

FIG. 7 illustrates example views 708 of an augmented reality interface of the wearable head-mounted device 102 relating to camera calibration using the wearable head-mounted device 102 and the attached calibration target 504, according to at least one example. The views 708 include virtual information in the form of directions 702 and a physical object, the aerial vehicle 106. The directions 702 are examples of the three-dimensional information 610, and may therefore identify the cameras 108 for collection of calibration data. To collect the calibration data, the user 110 may walk toward the cameras 108 and present the attached calibration target 504 to the cameras 108 (e.g., gaze at the cameras 108). In some examples, additional virtual information may be presented that indicates a time required for the user 110 to present the attached calibration target 504 (or any other calibration target described herein) to the cameras 108. For example, as the user 110 looks at the camera 108a, at the augmented reality interface may be presented a countdown clock that indicates an amount of time the attached calibration target 504 needs to remain in the field of view of the camera 108a such that the camera 108a can collect sufficient calibration data.

Figure 8:
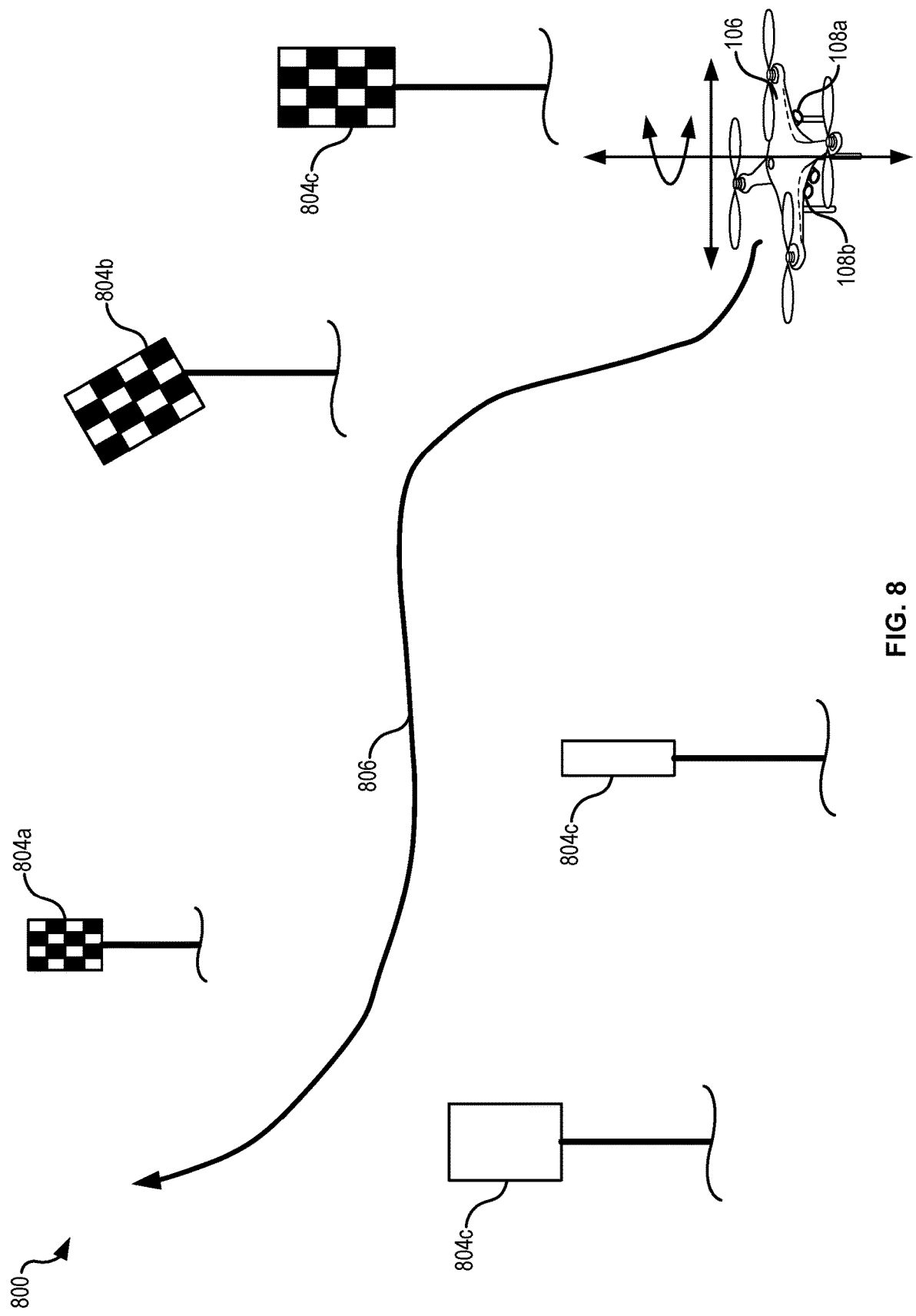
FIG. 8 illustrates an example environment for implementing techniques relating to camera calibration using fixed calibration targets, according to at least one example.

FIG. 8 illustrates an example environment 800 for implementing techniques relating to camera calibration using fixed calibration targets 804, according to at least one example. In this example, the fixed calibration targets 804 may be fixed such that their orientations and positions are fixed. The positions and orientations of the fixed calibration targets 804 may be accessed from a database or other storage device. Using information describing the fixed calibration targets 804 and information about the cameras 108, calibration instructions for the aerial vehicle 106 may be computed. The calibration instructions may indicate a three-dimensional flight path 806 for the aerial vehicle 106 to aerial movements for the aerial vehicle 106 to perform at particular positions along the flight path 806. The calibration instructions, when followed by the aerial vehicle 106 may present the cameras 108 to the fixed calibration targets 804 at the appropriate distances, orientations, and durations to enable collection of sufficient calibration data for calibrating the cameras 108. For example, as the aerial vehicle 106 navigates along the flight path 806, the aerial vehicle 106 may perform aerial movements such as pitching, yawing, rolling, rotating about the normal axis, and performing any other suitable aerial movements to present the cameras 108 to the fixed calibration targets 804. In some examples, the calibration data can be collected while the aerial vehicle 106 flies continuously along the flight path 806. In other examples, the aerial vehicle 106 slows down and/or even hovers adjacent to one or more fixed calibration targets 804 while calibration data is collected. As described herein, the fixed calibration targets 804 may be mounted at any suitable location.

In some examples, the fixed calibration targets 804 may be attached to an exterior of a building such as a warehouse from which the aerial vehicle 106 delivers items to customers or at some other location where aerial vehicles 106 customarily fly. In this manner, calibration data may be collected for calibrating the cameras 108 and/or validating existing calibrations with little interruption to usual operation of the aerial vehicles 106. In a simple example, as the aerial vehicle 106 leaves on a delivery mission, the aerial vehicle 106 may switch into a calibration validation mode prior to encountering the fixed calibration targets 804. Once the aerial vehicle 106 has passed the calibration targets 804 (e.g., executed the calibration instructions) and the calibration has been validated, the aerial vehicle 106 may be allowed to continue on its mission. In other examples, the fixed calibration targets 804 are mounted in a dedicated calibration area that has lower traffic and is used primarily for collection of calibration data.

Figure 9:
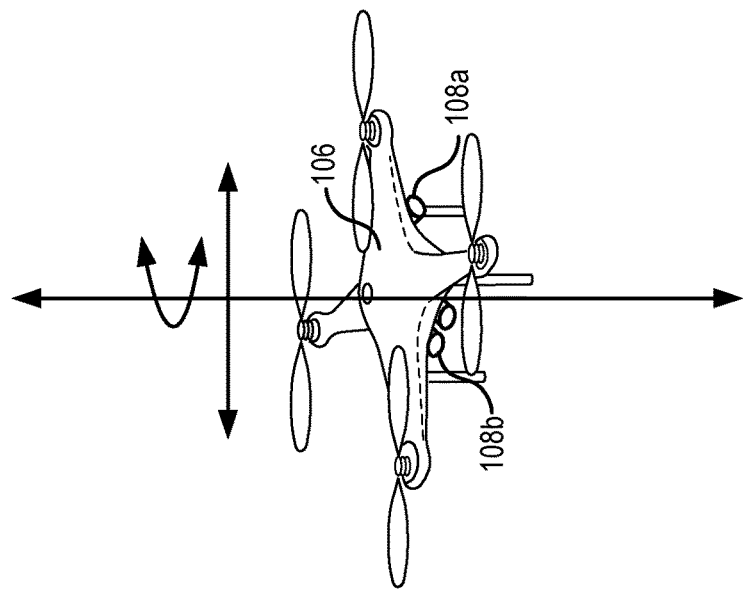
FIG. 9 illustrates an example environment for implementing techniques relating to camera calibration using a single fixed calibration target, according to at least one example.
Figure 9:
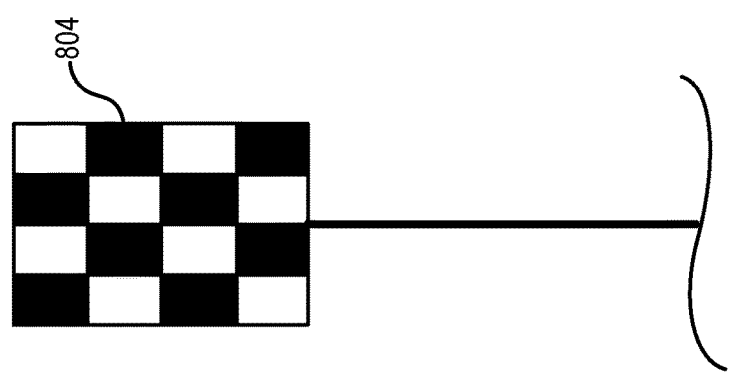

FIG. 9 illustrates an example environment 900 for implementing techniques relating to camera calibration using a single fixed calibration target 804, according to at least one example. In this example, the fixed calibration target 804 may be fixed such that its orientation and position are fixed. The position and orientation of the fixed calibration target 804 may be accessed from a database or other storage device. Using information describing the fixed calibration target 804 and information about the cameras 108, calibration instructions for the aerial vehicle 106 may be computed. The calibration instructions may indicate a set of aerial movements for the aerial vehicle 106 to perform with respect to the fixed calibration target 804. The calibration instructions, when followed by the aerial vehicle 106, may present the cameras 108 to the fixed calibration target 804 at the appropriate distances, orientations, and durations to enable collection of sufficient calibration data for calibrating the cameras 108. For example, the aerial vehicle 106 may perform aerial movements such as pitching, yawing, rolling, rotating about the normal axis, and performing any other suitable aerial movements to present the cameras 108 to the fixed calibration target 804.

Figure 10:
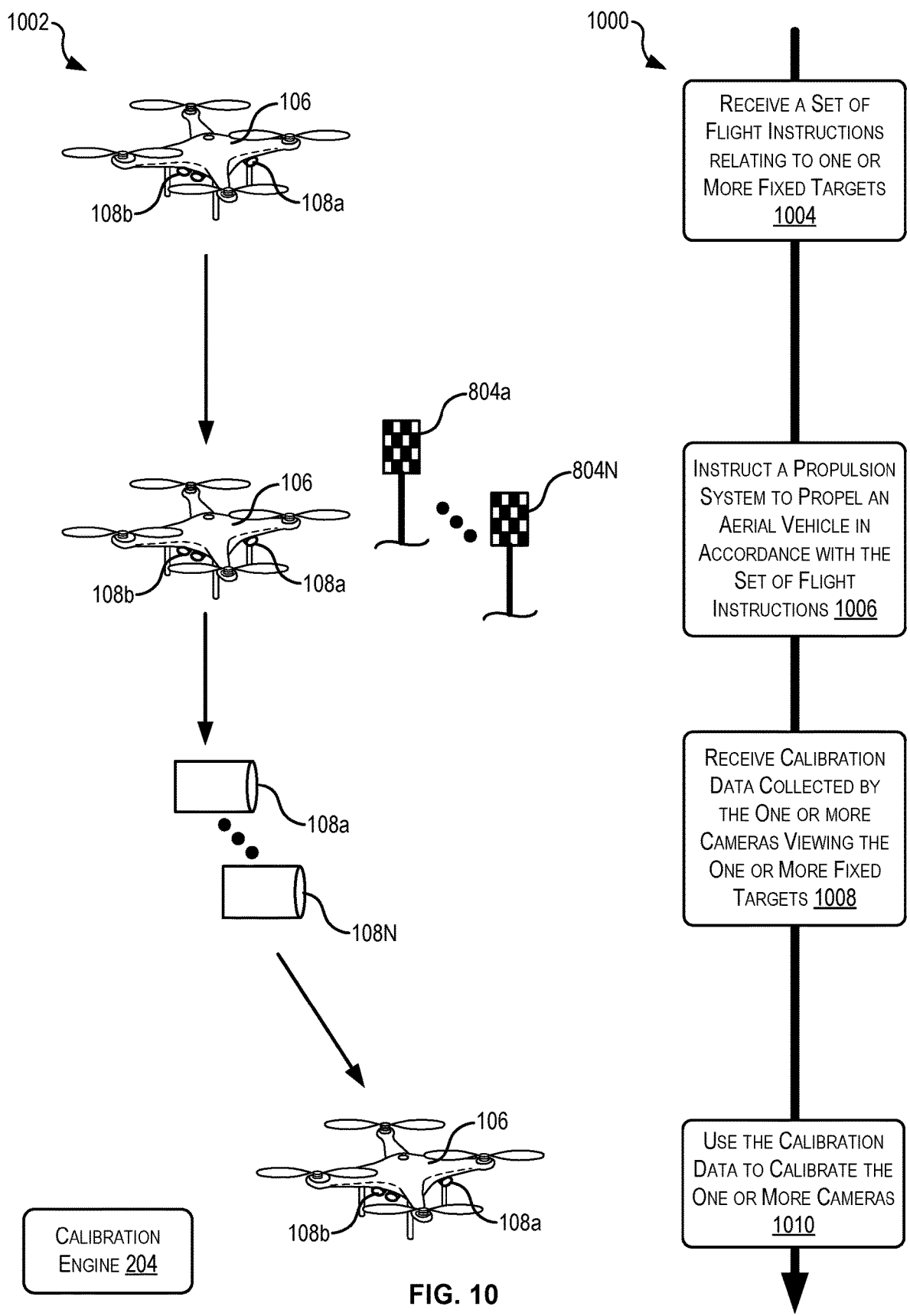
FIG. 10 illustrates an example flow diagram depicting example acts and corresponding illustrations for implementing techniques relating to camera calibration using fixed calibration targets, according to at least one example.

FIG. 10 illustrates an example flow diagram depicting example process 1000 and corresponding illustrations 1002 for implementing techniques relating to camera calibration using fixed calibration targets 804, according to at least one example. The process 1000 may be performed at least in part by the calibration engine 204. As described in detail herein, the calibration engine 204 may be any suitable software and/or hardware component configured to implement the techniques described herein. For example, the calibration engine 204 may be a software module executed by a computer system in communication with the wearable head-mounted device 102 and the aerial vehicle 106.

The process 1000 may begin at 1004 by receiving a set of flight instructions relating to one or more fixed targets (e.g., the fixed calibration targets 804). The set of flight instructions may include navigational instructions for the aerial vehicle 106 to follow to present the camera 108 to the fixed calibration targets 804.

At 1006, the process 1000 instructs a propulsion system to propel the aerial vehicle 106 in accordance with the set of flight instructions. This may include propelling the aerial vehicle 106 along a flight path and otherwise adjusting the position and orientation of the aerial vehicle 106—and more particularly the cameras 108—with respect to the fixed calibration targets 804.

In some examples, the process 1000 may also include receiving sensor data from onboard sensors (e.g., global positioning system sensor, gyroscope, accelerometer, etc.). The sensor data may be usable to determine position and orientation of the aerial vehicle 106 as the aerial vehicle 106 moves. The sensor data may be used to correct the set of flight instructions on the fly in order to collect the appropriate calibration data. For example, if the sensor data indicates that the aerial vehicle 106 is positioned and/or oriented with respect to a calibration target 804 in an unexpected manner, the sensor data may be used to compute instructions for adjusting the position and the orientation of the aerial vehicle 106. In this manner, the sensor data collected from onboard sensors can be used as feedback when collecting calibration data.

At 1008, the process 1000 receives calibration data collected by the one or more cameras (e.g., the cameras 108) viewing the one or more fixed calibration targets (e.g., the fixed calibration targets 804).

At 1010, the process 1000 uses the calibration data (e.g., collected at 1008) to calibrate the one or more cameras (e.g., the cameras 108). This may include using any suitable calibration technique capable of calibrating one camera 108 alone or more than one camera 108. If insufficient calibration data was collected at 1008, the process 1000 may further include instructing the propulsion system to again propel the aerial vehicle 106 in accordance with the set of flight instructions or in accordance with a set of adjusted flight instructions.

Figure 11:
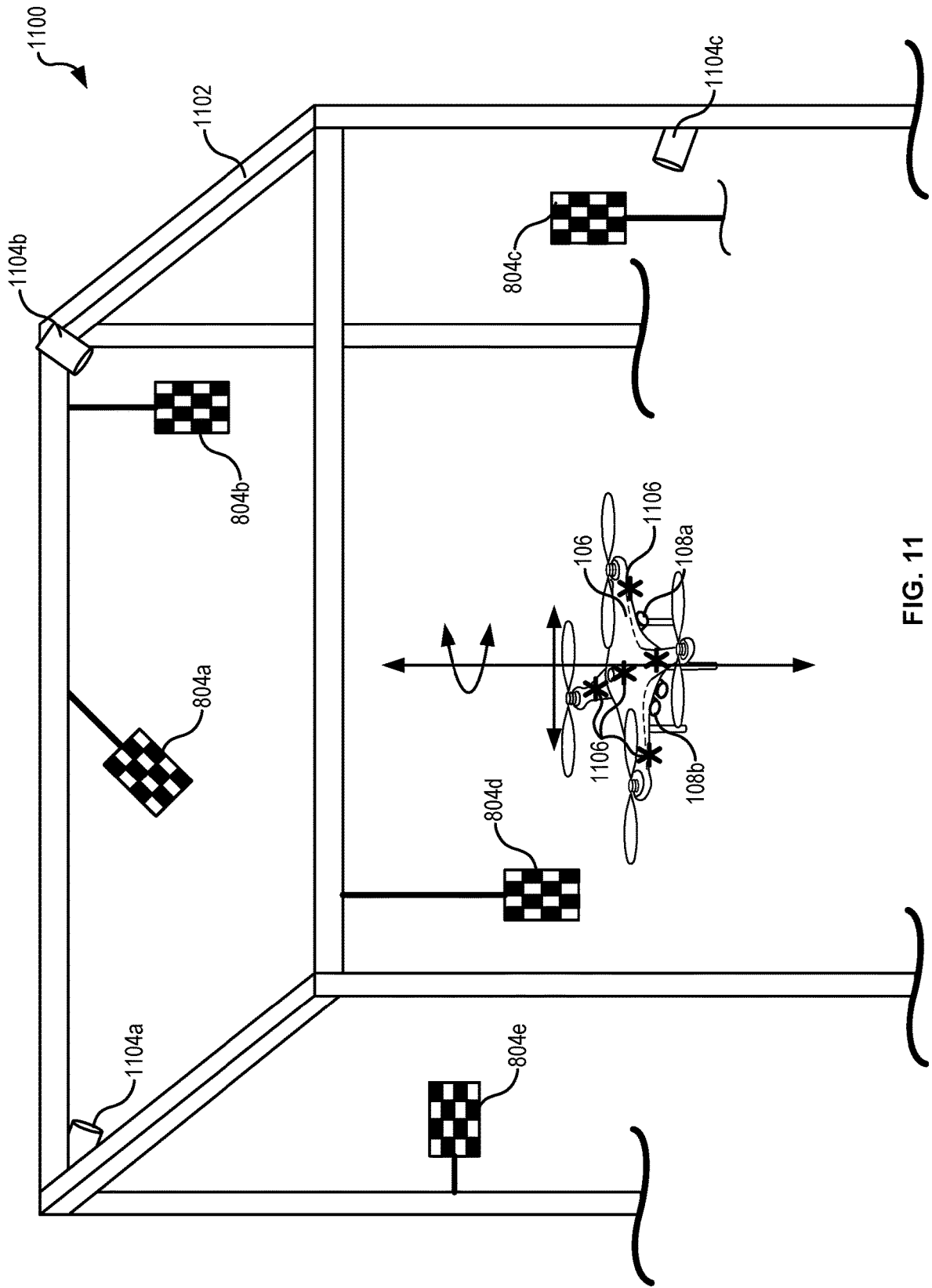
FIG. 11 illustrates an example motion tracking system for implementing techniques relating to camera calibration, according to at least one example.

FIG. 11 illustrates an example motion tracking system 1100 for implementing techniques relating to camera calibration, according to at least one example. The motion tracking system 1100 may be any suitable system capable of tracking position and orientation of a moving object. In this example, the motion tracking system 1100 may be configured to provide real-time tracking of position and orientation of the aerial vehicle 106 for purposes of collecting calibration data. The motion tracking system 1100 may include any suitable frame 1102 or other structure to support a plurality of sensors 1104 and a plurality of fixed calibration targets 804. The motion tracking system 1100 may define a motion tracking area (e.g., a three-dimensional area where the aerial vehicle 106 may be tracked). In some examples, the motion tracking area may correspond to the extents of the frame 1102. The plurality of sensors 1104 may be in communication with a management computer (not shown). The management computer may compute position and orientation based on sensor data received from the sensors 1104. The management computer, in some examples, may also include the calibration engine to calibrate the cameras 108 of the aerial vehicle 106.

The aerial vehicle 106 may be outfitted with a plurality of position tracking objects 1106 at various locations on the aerial vehicle 106. The position tracking objects 1106 may have acoustic, inertial, light-emitting diode, magnetic, reflective properties, or any suitable combination of the foregoing. For example, in a passive optical system, the position tracking objects 1106 may be coated with a reflective material to reflect light back to the sensors 1104 as sensor data. The reflected light can be used to determine a position and orientation of the aerial vehicle 106 with respect to a reference point (e.g., a corner of the frame 1102). The plurality of sensors 1104 may be any suitable sensor configured to sense the position tracking objects 1106. For example, the sensors 1104 may include acoustic sensors, inertial sensors, light sensors, magnetic sensors, and any other suitable combination of the foregoing.

Calibration instructions may be computed for the aerial vehicle 106 to execute within the motion tracking area. The calibration instructions may indicate a three-dimensional flight path for the aerial vehicle 106 and aerial movements for the aerial vehicle 106 to perform at particular positions along the flight path within the motion tracking area. The calibration instructions may be computed in order to present the cameras 108 to the calibration targets 804 to allow the cameras 108 to collect calibration data. Sensor data received from the sensors 1104 may be used as feedback to perform adjustments to the calibration instructions on the fly.

Figure 12:
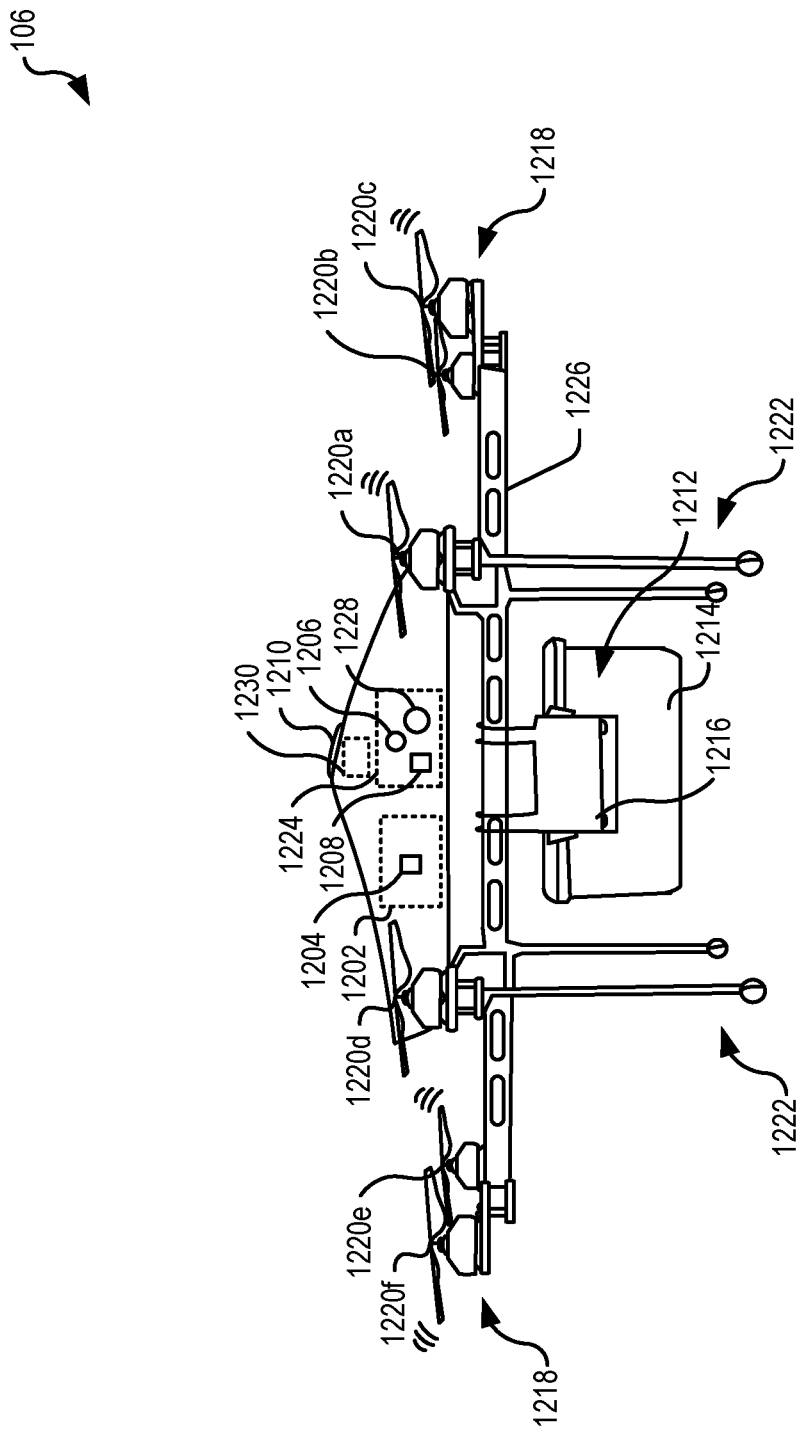
FIG. 12 illustrates an example aerial vehicle for implementing techniques relating to camera calibration as described herein, according to at least one example.

FIG. 12 illustrates an example aerial vehicle 106 for implementing techniques relating to camera calibration, according to at least one example. The aerial vehicle 106 may be designed in accordance with commercial aviation standards and may include multiple redundancies to ensure reliability. For purposes of this specification, the aerial vehicle 106 may include a plurality of systems or subsystems operating under the control of, or at least partly under the control of, a management system 1202. The management system 1202 may include an aerial vehicle management device 1204 (e.g., an onboard computer) for autonomously or semi-autonomously controlling and managing the aerial vehicle 106 and, in some examples, for enabling remote control by a pilot. The aerial vehicle management device 1204 will be discussed in more detail with reference to FIG. 13. Portions of the management system 1202, including the aerial vehicle management device 1204, may be housed under top cover 1210. As used herein, the management system 1202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices, sensors, and/or antennas (e.g., global positioning system sensor ("GPS"), inertial navigation system ("INS"), range finder, Radio Detection And Ranging ("RADAR"), accelerometer (e.g., three-axis accelerometer), gyroscope (e.g., three-axis gyroscope), magnetometer, barometer, distance sensor, inertial measurement units, current sensors, tilt sensors (e.g., a combination of an accelerometer and a gyroscope), and other systems to aid in navigating the aerial vehicle 106, detecting objects, and managing operation of the aerial vehicle 106) (not shown), radio-frequency identification ("RFID") capability (not shown), and interfaces capable of speech interpretation and recognition (not shown).

The aerial vehicle 106 may also include a communication system 1224 housed within the top cover 1210. The communication system 1224 may include one or more light sensors 1228 (e.g., imaging device, depth sensor, visible light camera, infrared camera, RGB camera, depth aware camera, infrared laser projector, ultraviolet sensitive cameras, scanning sensor, light filters and any combination of the foregoing), one or more auditory sensors 1206 (e.g., microphone, noise filters, and other sensors for capturing sound), and one or more output devices 1208 (e.g., microphone, speaker, laser projector, light projector, and other devices for outputting communication information). In some examples, the light sensors 1228 include one or more image capture devices such as still shot cameras, video cameras, and other similar image capture devices. The light sensors 1228 and other image capture devices may be disposed about the aerial vehicle 106 to assist in navigation, object detection, and for any other purpose. Thus, the light sensors 1228 and other image capture devices may be oriented outwards, downwards, and upwards with respect to the aerial vehicle 106. The light sensor 1228 and other image capture devices are examples of the cameras 108.

The management system 1202 may be configured to receive information and provide information via components of the communication system 1224. For example, the aerial vehicle 106 may support two-way communication with operators. Two-way communication may be beneficial for verifying operators' identities that interact with the aerial vehicle 106, for posing questions to operators, and for providing instructions to operators. In some examples, the communication system 1224 may operate semi-autonomously or autonomously.

As shown in FIG. 12, the aerial vehicle 106 may also include a retaining system 1212. The retaining system 1212 may be configured to retain payload 1214. In some examples, the retaining system 1212 may retain the payload 1214 using friction, vacuum suction, opposing arms, magnets, and other retaining methods. As illustrated in FIG. 12, the retaining system 1212 may include two opposing arms 1216 (only one is illustrated) configured to retain the payload 1214. The aerial vehicle management device 1204 may be configured to control at least a portion of the retaining system 1212. In some examples, the retaining system 1212 may be configured to release the payload 1214 in one of a variety of ways. For example, the retaining system 1212 (or other system of the aerial vehicle 106) may be configured to release the payload 1214 with a winch and spool system, by the retaining system 1212 releasing the payload, and other methods of releasing the payload. In some examples, the retaining system 1212 may operate semi-autonomously or autonomously.

In FIG. 12, the payload 1214 is illustrated as a delivery box. In some examples, the delivery box may include one or more packages or items intended for delivery to a recipient. The payload 1214, whether as a delivery box or otherwise, may be configured for delivery using a variety of different methods. For example, the payload 1214 may include a parachute that opens and slows the payload's 1214 descent as it falls to its delivery location. In some examples, the payload 1214 may include padding surrounding its package to reduce the impact of a drop from the aerial vehicle 106 above the ground. The aerial vehicle 106 may also deliver the payload 1214 by fully landing on the ground and releasing the retaining system 1212.

Further, the aerial vehicle 106 may include propulsion system 1218. In some examples, the propulsion system 1218 may include rotary blades or otherwise be a propeller-based system. As illustrated in FIG. 12, the propulsion system 1218 may include a plurality of propulsion devices, a few of which, 1220a-1220f, are shown in this view. Each propulsion device may include one or more propellers, a motor, wiring, a balance system, a control mechanism, and other features to enable flight. In some examples, the propulsion system 1218 may operate at least partially under the control of the aerial vehicle management device 1204. In some examples, the propulsion system 1218 may be configured to adjust itself without receiving instructions from the aerial vehicle management device 1204. Thus, the propulsion system 2118 may operate semi-autonomously or autonomously. The propulsion system 1218 may enable multi-directional flight of the aerial vehicle 106 (e.g., by adjusting each propulsion device individually). In some examples, the aerial vehicle 106 may be a fixed-wing unmanned aerial vehicle.

The aerial vehicle 106 may also include a landing structure 1222. The landing structure 1222 may be adequately rigid to support the aerial vehicle 106 and the payload 1214. The landing structure 1222 may include a plurality of elongated legs which may enable the aerial vehicle 106 to land on and take off from a variety of different surfaces. The plurality of systems, subsystems, and structures of the aerial vehicle 106 may be connected via frame 1226. The frame 1226 may be constructed of a rigid material and be capable of receiving, via different connections, the variety of systems, sub-systems, and structures. For example, the landing structure 1222 may be disposed below the frame 1226 and, in some examples, may be formed from the same material and/or same piece of material as the frame 1226. The propulsion system 1218 may be disposed radially around a perimeter of the frame 1226 or otherwise distributed around the frame 1226.

The aerial vehicle 106 may also include a deployable slowing device 1230. The deployable slowing device 1230 may include any suitable device capable of slowing down the descent of the aerial vehicle 106 when deployed. For example, the deployable slowing device 1230 may include a streamer, a parachute, or other comparable structure coupled to a deploying means. The deploying means may be electrically actuated, mechanically actuated, and/or actuated in any other suitable manner. In some examples, the aerial vehicle 106 may include more than one deployable slowing device 1230. For example, a plurality of such devices 1230 may be deployed about the perimeter of the aerial vehicle 106 (e.g., at each of the propulsion devices 1220).

Figure 13:
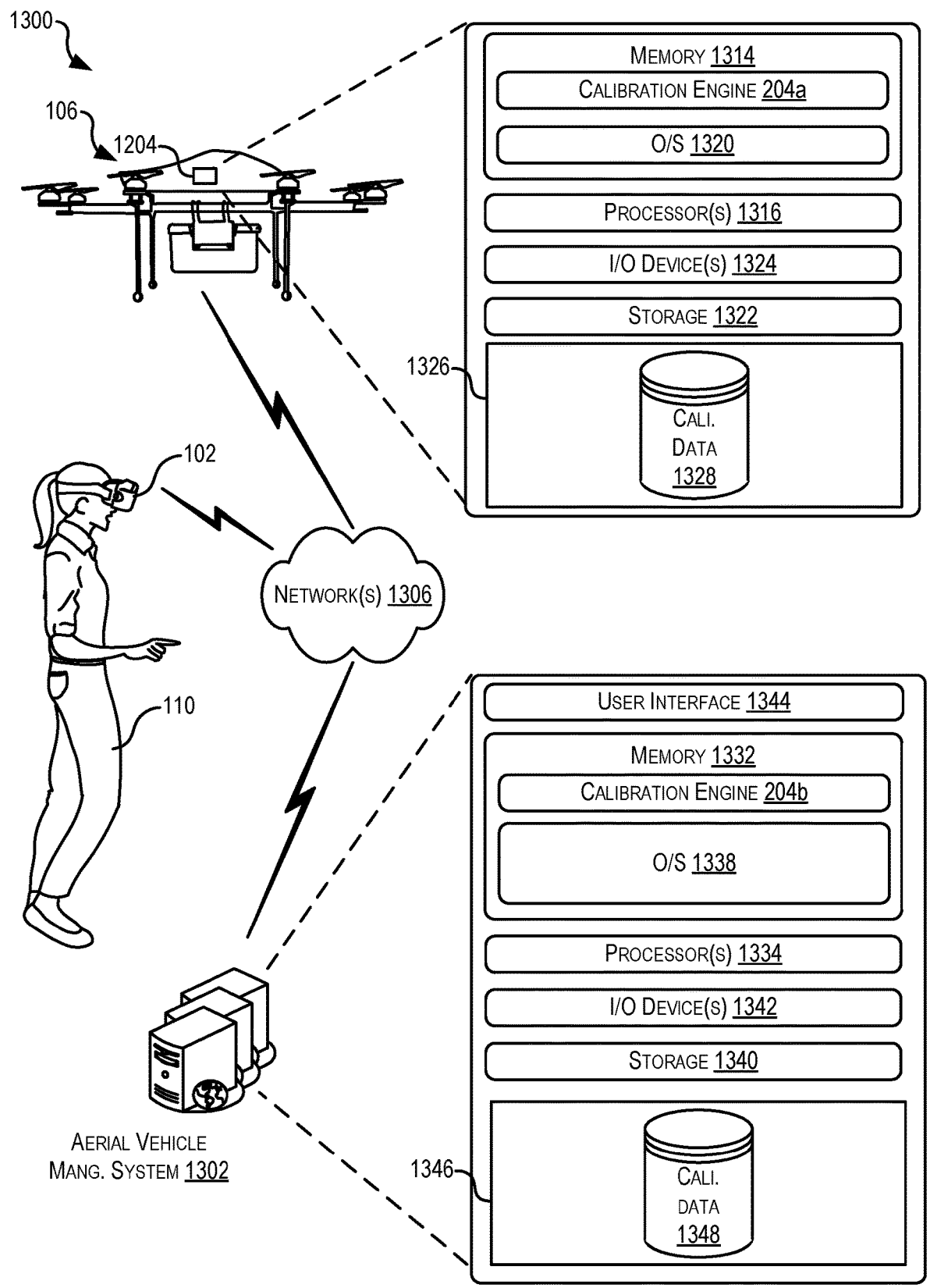
FIG. 13 illustrates an example schematic architecture and devices for implementing techniques relating to camera calibration as described herein, according to at least one example.

FIG. 13 illustrates an example schematic architecture 1300 for implementing techniques relating to camera calibration, according to at least one example. The architecture 1300 may include an aerial vehicle management system 1302, the aerial vehicle 106, and the wearable head-mounted device 102.

The aerial vehicle management system 1302 may be associated with an electronic marketplace (not shown) and interface with purchase and delivery services of the electronic marketplace. In this manner, the aerial vehicle management system 1302 may coordinate delivery of items via aerial vehicles, such as the aerial vehicle 106, to customers of the electronic marketplace. In some examples, the aerial vehicle management system 1302 may coordinate flight plans of the aerial vehicle 106 and other aerial vehicles 106 (e.g., compute routes, identify landing locations, etc.). In some examples, the aerial vehicle management system 1302 may be a stand-alone service devoted to computing flight plans.

The aerial vehicle management system 1302 may be in communication with the aerial vehicle 106 and the wearable head-mounted device 102 via one or more network(s) 1306 (hereinafter, "the network 1306"). The network 1306 may include any one or a combination of many different types of networks, such as cable networks, the Internet, wireless networks, cellular networks, radio networks, and other private and/or public networks. In some examples, the wearable head-mounted device 102 shares a wired connection with the aerial vehicle management system 1302 and/or the aerial vehicle 106. The aerial vehicle management system 1302 may be configured to provide back-end control of the aerial vehicle 106 prior to, during, and after completion of its mission. In some examples, the aerial vehicle 106 may be configured to accomplish its mission (e.g., deliver its payload to a customer) with little to no communication with the aerial vehicle management system 1302.

Turning now to the details of the aerial vehicle management device 1204 of the aerial vehicle 106, the aerial vehicle management device 1204 may include at least one memory 1314 and one or more processing units (or processor(s)) 1316. The processor(s) 1316 may be implemented as appropriate in hardware, computer-executable instructions, software, firmware, or combinations thereof. Computer-executable instruction, software, or firmware implementations of the processor(s) 1316 may include computer-executable or machine-executable instructions written in any suitable programming language to perform the various functions described. The memory 1314 may include more than one memory and may be distributed throughout the aerial vehicle management device 1204 and/or the aerial vehicle management system 1302. The memory 1314 may store program instructions (e.g., a calibration engine 204*a*) that are loadable and executable on the processor(s) 1316, as well as data generated during the execution of these programs. Depending on the configuration and type of memory including the calibration engine 204*a*, the memory 1314 may be volatile (such as random access memory ("RAM")) and/or non-volatile (such as read-only memory ("ROM"), flash memory, or other memory). The aerial vehicle management device 1204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1314 may include multiple different types of memory, such as static random access memory ("SRAM"), dynamic random access memory ("DRAM"), or ROM. The memory 1314 may also include an operating system 1320.

In some examples, the aerial vehicle management device 1204 may also include additional storage 1322, which may include removable storage and/or non-removable storage. The additional storage 1322 may include, but is not limited to, magnetic storage, optical disks, and/or tape storage. The disk drives and their associated computer-readable media may provide non-volatile storage of computer-readable instructions, data structures, program modules, and other data for the computing devices.

The memory 1314 and the additional storage 1322, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the calibration engine 204. The modules of the calibration engine 204 may include one or more components, modules, and the like. The aerial vehicle management device 1204 may also include input/output ("I/O") device(s) and/or ports 1324, such as for enabling connection with a keyboard, a mouse, a pen, a voice input device, a touch input device, a display, speakers, a printer, or other I/O device. The I/O device(s) 1324 may enable communication with the other systems of the aerial vehicle 106 (e.g., other parts of the management system, power system, communication system, navigation system, propulsion system, and the retaining system).

The aerial vehicle management device 1204 may also include a data store 1326. The data store 1326 may include one or more databases, data structures, or the like for storing and/or retaining information associated with implementation of the techniques described herein. In some examples, the data store 1326 may include databases, such as calibration database 1328.

The calibration database 1328 may be used to retain information usable to collect calibration data and the actual calibration data itself. For example, the calibration database 1328 may include information about the cameras 108 mounted on the aerial vehicle 106 (e.g., internal parameters, position and orientation with respect to other cameras 108 and/or the aerial vehicle 106, and other similar information). The calibration database 1328 may also include calibration data collected and/or positions where calibration data is required to perform a calibration. During calibration of the cameras 108, the information in the calibration database 1328 may be accessed.

Turning now to the aerial vehicle management system 1302, the aerial vehicle management system 1302 may include one or more service provider computers, perhaps arranged in a cluster of servers or as a server farm. In some examples, the aerial vehicle management system 1302 may include one or more virtual computers. The aerial vehicle management system 1302 may include at least one memory 1332 and one or more processing units (or processor(s)) 1334. The processor(s) 1334 may be implemented as appropriate in hardware, computer-executable instructions, software, firmware, or combinations thereof. Computer-executable instructions, software or firmware implementations of the processor(s) 1334 may include computer-executable or machine-executable instructions written in any suitable programming language to perform the various functions described. The memory 1332 may include more than one memory and may be distributed throughout the aerial vehicle management system 1302. The memory 1332 may store program instructions (e.g., the calibration engine 204*b*) that are loadable and executable on the processor(s) 1334, as well as data generated during the execution of these programs. The memory 1332 may be volatile (such as random access memory (RAM)) and/or non-volatile (such as read-only memory (ROM), flash memory, or other memory).

The aerial vehicle management system 1302 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1332 may include multiple different types of memory, such as static random access memory (SRAM), dynamic random access memory (DRAM), or ROM. The memory 1332 may also include an operating system 1338.

The calibration engine 204*b*, in some examples, may function similar to the calibration engine 204*a*. For example, depending on the implementation, the calibration engine 204*b* or the calibration engine 204*a* may provide the augmented-reality interface for presentation at the wearable head-mounted device 102. Additionally, depending on the implementation, the calibration engine 204*b* or the calibration engine 204*a* may calibrate the cameras 108.

In some examples, the aerial vehicle management system 1302 may also include additional storage 1340, which may include removable storage and/or non-removable storage. The additional storage 1340 may include, but is not limited to, magnetic storage, optical disks, and/or tape storage. The disk drives and their associated computer-readable media may provide non-volatile storage of computer-readable instructions, data structures, program modules, and other data for the computing devices.

The memory 1332 and the additional storage 1340, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the aerial vehicle management system 1302. The aerial vehicle management system 1302 may also include input/output (I/O) device(s) and/or ports 1342, such as for enabling connection with a keyboard, a mouse, a pen, a voice input device, a touch input device, a display, speakers, a printer, or other I/O device.

In some examples, the aerial vehicle management system 1302 may include a user interface 1344. The user interface 1344 may be utilized by an operator, or other authorized user to access portions of the aerial vehicle management system 1302. In some examples, the user interface 1344 may include a graphical user interface, web-based applications, programmatic interfaces such as application programming interfaces ("APIs"), or other user interface configurations.

For example, the user interface 1344 may enable an operator to remotely control the aerial vehicle 106 and/or provide instructions to the wearable head-mounted device 102. The aerial vehicle management system 1302 may also include data store 1346. The data store 1346 may include one or more databases, data structures, or the like for storing and/or retaining information associated with the aerial vehicle management system 1302. The data store 1346 may include databases, such as a calibration database 1348. The calibration database 1348 may include similar information as the calibration database 1328. In some examples, the aerial vehicle management system 1302 may store a larger amount of information in the data store 1346 than the aerial vehicle management device 1204 is capable of storing in the data store 1326. Thus, in some examples, at least a portion of the information from the databases in the data store 1346 is copied to the databases of the data store 1326, e.g., periodically, occasionally, in connection with an event, or otherwise. In this manner, the data store 1326 may have up-to-date information, without having to maintain the databases. In some examples, this information may be transferred as part of a calibrating a set of cameras, on an as-needed basis, and in any other suitable manner.

Figure 14:
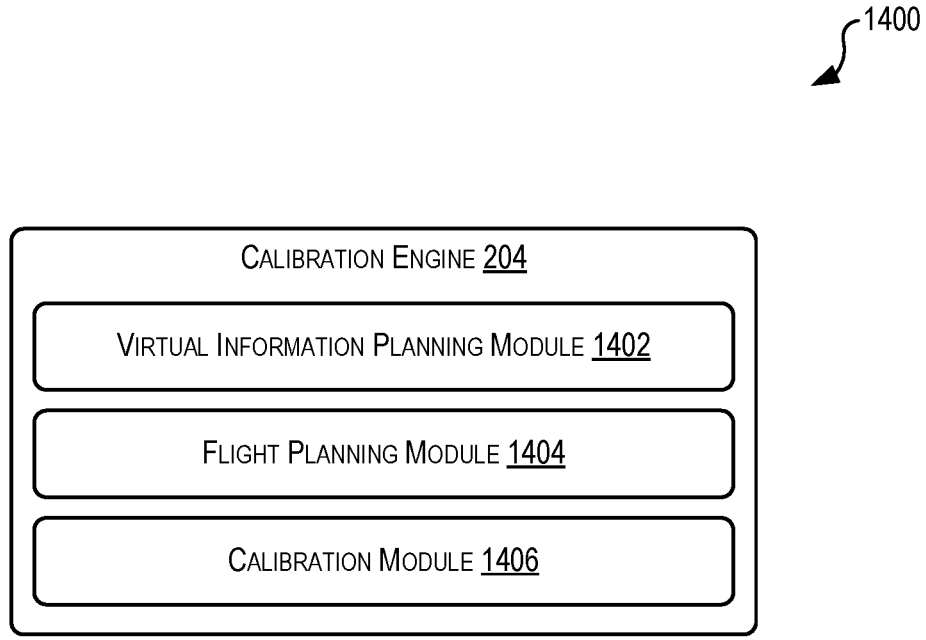
FIG. 14 illustrates an example device for implementing techniques relating to camera calibration as described herein, according to at least one example.

FIG. 14 illustrates an example device 1400 including the calibration engine 204. The calibration engine 204 may be configured to manage one or more sub-modules, components, engines, and/or services directed to examples disclosed herein. For example, the calibration engine 204 includes a virtual information planning module 1402, a flight planning module 1404, and a calibration module 1406. While these modules are illustrated in FIG. 14 and will be described as performing discrete tasks with reference to the flow charts, it is understood that FIG. 14 illustrates example configurations and other configurations performing other tasks and/or similar tasks as those described herein may be implemented according to the techniques described herein. Other modules, components, engines, and/or services may perform the same tasks as the calibration engine 204 or other tasks. Each module, component, or engine may be implemented in software, firmware, hardware, and in any other suitable manner.

Generally, the virtual information planning module 1402 may be configured to determine what information should be presented at the augmented-reality interface of the wearable head-mounted device 102. This may also include determining timing of the presentation.

Generally, the flight planning module 1404 may be configured to determine flight instructions for the aerial vehicle 106 to collect calibration data and, when appropriate, causing a propulsion system of the aerial vehicle 106 to fly in accordance with the flight instructions.

Generally, the calibration module 1406 may be configured to manage the collection of calibration data and the actual calibration of the cameras. For example, the calibration module 1406 may receive calibration data as the cameras view the calibration targets. Based on this data, the calibration module 1406 may communicate with the other modules 1402, 1404 regarding whether and at what locations and orientations additional calibration data is needed.

Figure 15:
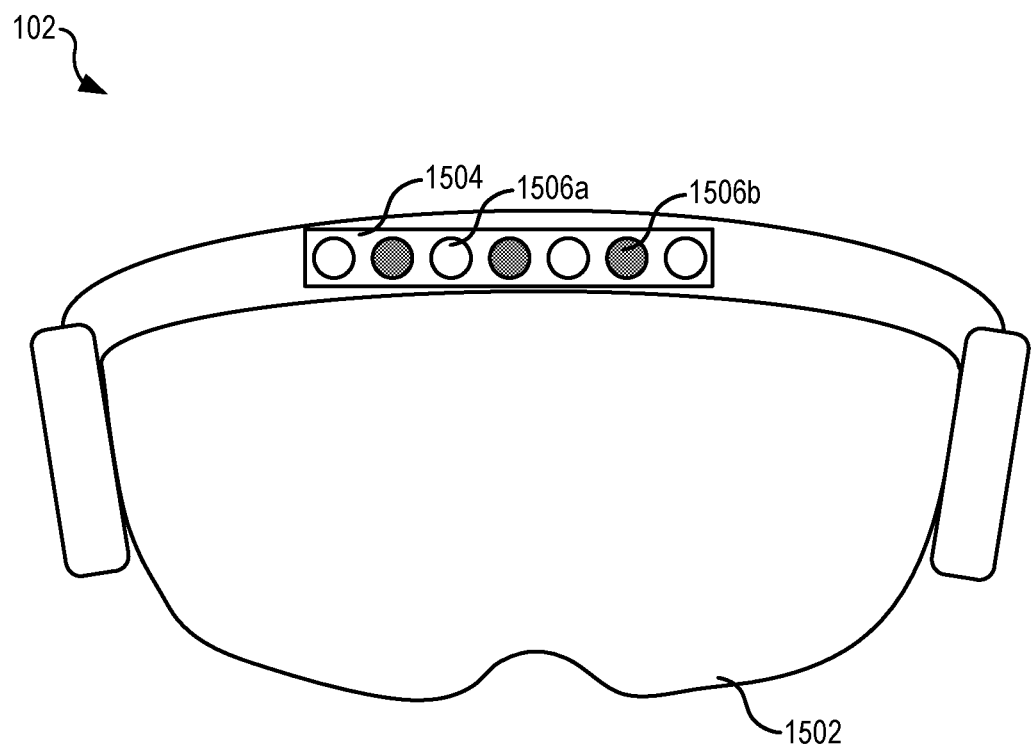
FIG. 15 illustrates an example head-mounted wearable device for implementing techniques relating to camera calibration using head-mounted wearable devices, according to at least one example.

FIG. 15 illustrates an example head-mounted wearable device (e.g., the wearable head-mounted device 102) for implementing techniques relating to camera calibration using the wearable head-mounted device 102, according to at least one example. The wearable head-mounted device 102 may include any suitable combination of sensors, processing chips, software modules, power supplies, network radios, interfaces, memory modules, input/output devices, and the like to perform the techniques described herein. For example, they may include a sensor bar that includes environmental sensing cameras, a depth camera (e.g., time of flight camera), an ambient light sensor, and a photo/high-definition video camera. The environmental sensing cameras may be used for head tracking and depth camera may be used for virtual surface reconstruction. The wearable head-mounted device 102 may also include a head band or other structure for mounting the wearable head-mounted device 102 to a wearer's head. The wearable head-mounted device 102 may also include a lens 1502 on which may be presented the virtual information. The wearable head-mounted device 102 may also include an active calibration target 1504 attached to the wearable head-mounted device 102. The active calibration target 1504 may include a plurality of lighting elements 1506 (e.g., a light-emitting diode bar). The lighting elements 1506 may be selectively activated to present a pattern for calibration purposes. For example, as illustrated in FIG. 15, the lighting element 1506*a* is illustrated as inactive and the lighting element 1506*b* is illustrated as active. In the illustrated example, alternating ones of the lighting elements 1506 are active. More complex and even simpler patterns may be created by selectively activating the lighting elements 1506. In some examples, the pattern formed by the lighting elements 1506 may change as the user 110 presents the calibration target 1504 to different cameras 108. In some examples, the pattern may change depending on the distance of the user 110 from the camera 108. For example, simpler patterns may be presented when the user 110 is collecting calibration data at a greater distance from the cameras 108, while more complex patterns may be appropriate when the user 110 is closer to the cameras 108. In some examples, the calibration instructions may control the operation of the active calibration target 1504. In some examples, the pattern can be updated based on resolution of the cameras 108, lens types of the cameras 108, camera types of the cameras 108, purposes of the cameras 108, orientations of the cameras 108, and any other aspect of the cameras 108 that may relevant to the pattern.

In some examples, instead of or in addition to the active calibration target 1504, a passive calibration target may be attached to or otherwise included on the wearable head-mounted device 102. For example, a sticker including a pattern may be attached to the front of the wearable head-mounted device 102. The pattern of the sticker may be used to collect calibration data. In some examples, the passive calibration target may be placed on the lens 1502 in a manner that does not interfere with the vision of the user 110. For example, the passive calibration target may be invisible to the user 110, but visible to the cameras 108. In some examples, one or more polarization filters or other filters may be applied to the passive calibration target. In some examples, the calibration target may be placed on the lens 1502 in a manner that is out of focus for the user 110, but which is in focus for the cameras 108.

The active calibration target 1504 (or more than one active calibration target 1504) may be attached to an article of clothing worn by the user 110 or an article held by the user 110 (e.g., a moveable calibration target). For example, a plurality of active calibration targets 1504 may be attached to a vest or shirt worn by the user 110. The calibration data may be collected as the cameras 108 view the article worn by the user 110. In this example, because multiple targets are included on the article of clothing more complex patterns may be created.

Figure 16:
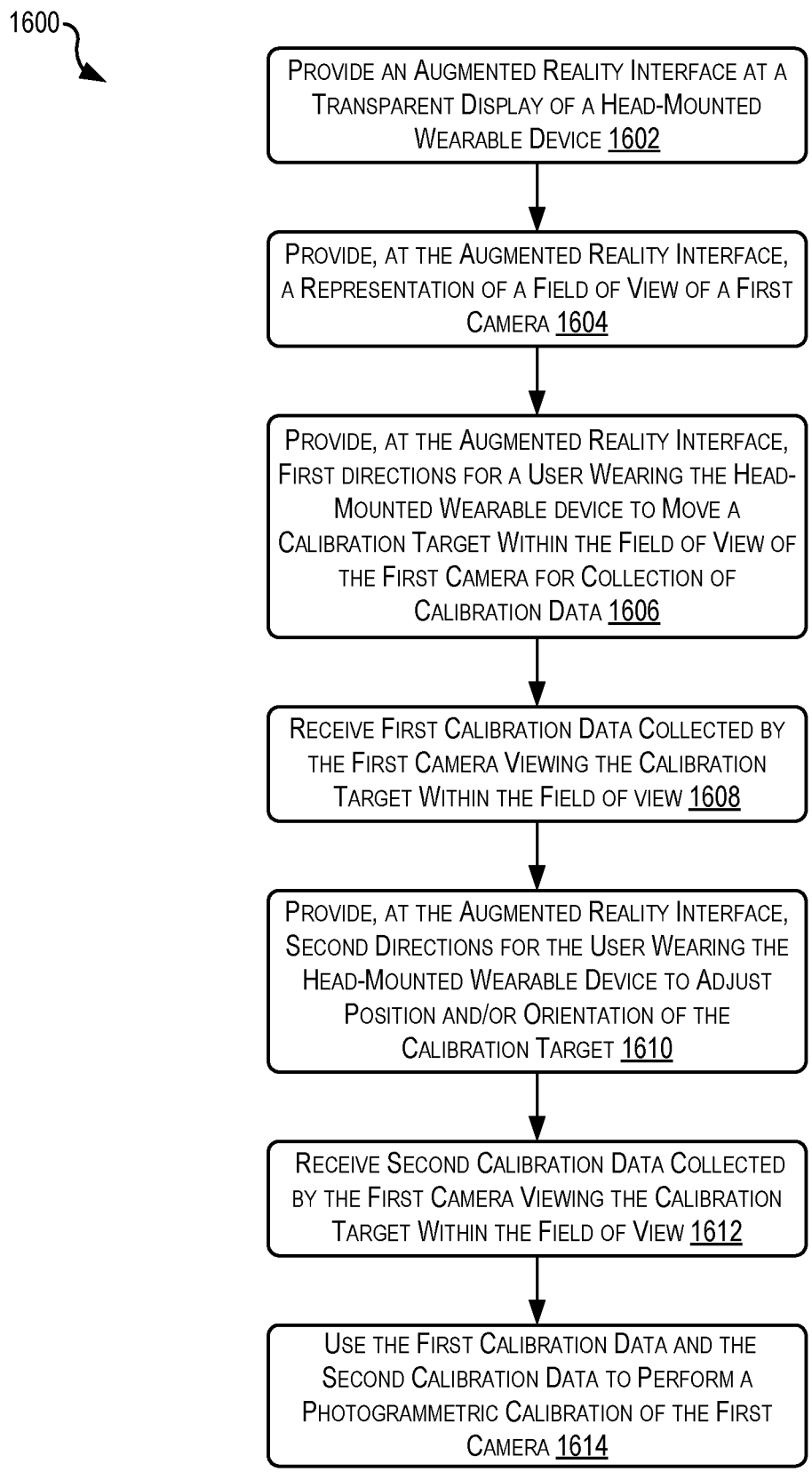
FIG. 16 illustrates an example flow diagram depicting example acts for implementing techniques relating to camera calibration using a wearable head-mounted device and a moveable calibration target, according to at least one example.

FIG. 16 illustrates the process 1600 for implementing techniques relating to camera calibration using a wearable head-mounted device and a moveable calibration target, according to at least one example. The process 1600 may be performed at least in part by the calibration engine 204, whether embodied in the aerial vehicle 106, the aerial vehicle management system 1302, some other computing device, or some combination of the foregoing.

The process 1600 begins at 1602 by providing an augmented reality interface at a transparent display of a head-mounted wearable device.

At 1604, the process 1600 provides, at the augmented reality interface, a representation of a field of view of a first camera. The first camera may be one of a plurality of cameras attached to a vehicle such as an unmanned aerial vehicle. The representation may include first three-dimensional virtual information indicating a first area within the field of view for collection of calibration data. In some examples, the representation may include second three-dimensional virtual information indicating a second area within the field of view where the calibration data has previously been collected. In some examples, the representation of the field of view may be a three-dimensional point cloud, with the first three-dimensional virtual information representing an unsatisfied portion of the three-dimensional point cloud. In this example, collection of the calibration data by the first camera may function to satisfy the unsatisfied portion of the three-dimensional point cloud.

At 1606, the process 1600 provides, at the augmented reality interface, first directions for a user wearing the head-mounted wearable device to move a calibration target within the field of view of the first camera for collection of the calibration data.

At 1608, the process 1600 receives first calibration data collected by the first camera viewing the calibration target within the field of view. This may be performed after the user has moved the calibration target within the field of view.

At 1610, the process 1600 provides, at the augmented reality interface, second directions for the user wearing the head-mounted wearable device to adjust position and/or orientation of the calibration target with respect to the first camera.

At 1612, the process 1600 receives second calibration data collected by the first camera viewing the calibration target within the field of view. This may be performed after the user has adjusted at least one of the position or the orientation of the calibration target.

At 1614, the process 1600 uses the first calibration data and the second calibration data to perform a photogrammetric calibration of the first camera.

In some examples, the process 1600 may further include providing, at the augmented reality interface, a second representation of the field of view of the first camera. The second representation may include second three-dimensional virtual information indicating successful collection of the calibration data in the first area within the field of view.

Figure 17:
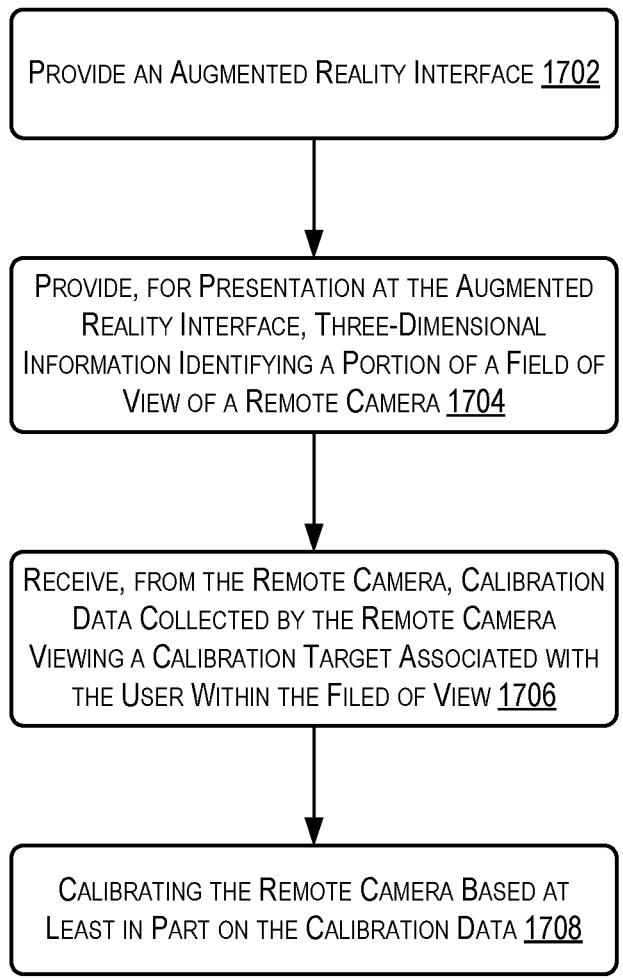
FIG. 17 illustrates an example flow diagram depicting example acts for implementing techniques relating to camera calibration using a wearable head-mounted device and a moveable calibration target, according to at least one example.

FIG. 17 illustrates the process 1700 depicting example acts for implementing techniques relating to camera calibration using a wearable head-mounted device and a moveable calibration target, according to at least one example. The process 1700 may be performed at least in part by the calibration engine 204, whether embodied in the aerial vehicle 106, the aerial vehicle management system 1302, some other computing device, or some combination of the foregoing.

The process 1700 begins at 1702 by providing an augmented reality interface. In some examples, the augmented reality interface may be presented at a transparent display of a head-mounted wearable device that is worn by a user.

At 1704, the process 1700 provides, for presentation at the augmented reality interface, three-dimensional information identifying a portion of a field of view of a remote camera. The three-dimensional information may include virtual information. The identified portion of the field of view may be associated with collection of calibration data for the remote camera.

In some examples, the remote camera is one of a set of remote cameras. In this example, the virtual information may identify a second portion of a second field of view of a second remote camera that is associated with collection of the calibration data for the second remote camera.

In some examples, the three-dimensional virtual information may represent a three-dimensional point cloud that is satisfied by collection of the calibration data. The three-dimensional point cloud may include first indicia identifying a first three-dimensional portion of the point cloud that is satisfied and second indicia identifying a second three-dimensional portion of the point cloud that is unsatisfied.

In some examples, the three-dimensional information may include directions for the user wearing the head-mounted wearable device to move the calibration target within the field of view such that the remote camera can collect the calibration data.

In some examples, the three-dimensional information may include directions for the user wearing the head-mounted wearable device to change the position and the orientation of the calibration target with respect to the remote camera.

At 1706, the process 1700 receives, from the remote camera, calibration data collected by the remote camera viewing a calibration target associated with the user within the field of view. In some examples, a position and an orientation of the calibration target with respect to the remote camera may be changed by the user when the calibration target is within the field of view. For example, the user may raise and lower the calibration target. In some examples, the calibration target may include a handheld object including a calibration pattern.

At 1708, the process 1700 calibrates the remote camera based at least in part on the calibration data.

In some examples, the received calibration data is considered first calibration data. In this example, the process 1700 may further include receiving, from the remote camera, second calibration data collected by the remote camera viewing the calibration target when the calibration target is located at a second position within the field of view. Calibrating the camera at 1708 may further be based at least in part on the second calibration data.

In some examples, the remote camera may be attached to an aerial vehicle. The remote camera may be part of an object detection system of the aerial vehicle. In some examples, the remote camera is attached to a non-aerial vehicle such as an automobile, a bus, a train, a ship, or any other suitable vehicle.

In some examples, providing the augmented reality interface may include providing by an onboard computing device of the aerial vehicle. In some examples, providing the three-dimensional virtual information may include providing by the onboard computing device. In some examples, calibrating the camera may include calibrating by the onboard computing device.

Figure 18:
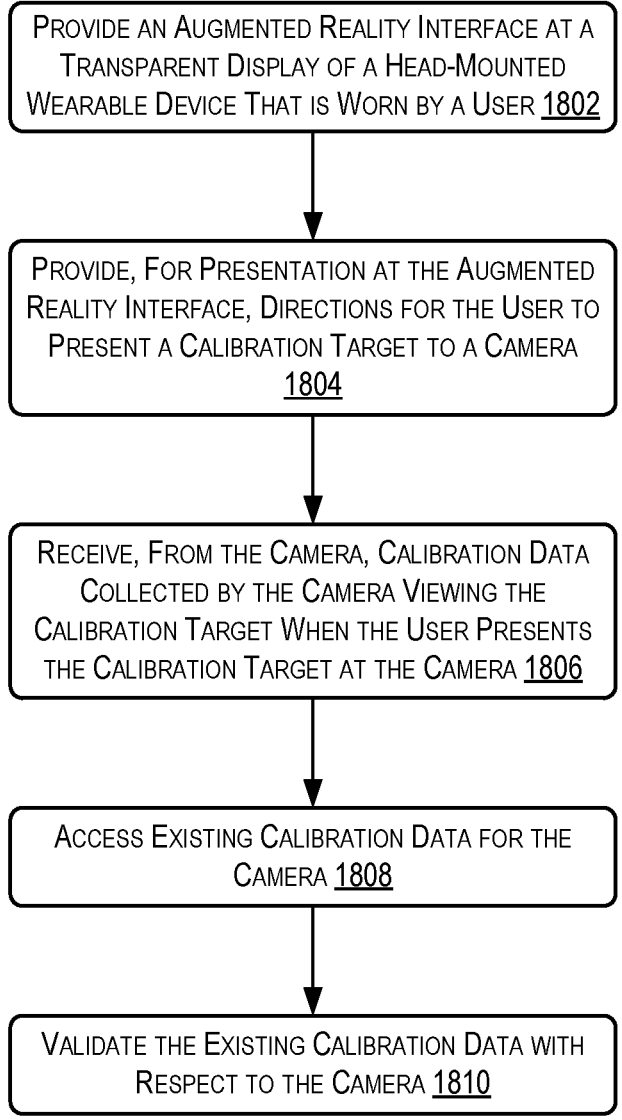
FIG. 18 illustrates an example flow diagram depicting example acts for implementing techniques relating to camera calibration using a wearable head-mounted device and a moveable calibration target, according to at least one example.

FIG. 18 illustrates the process 1800 depicting example acts for implementing techniques relating to camera calibration using a wearable head-mounted device and a moveable calibration target, according to at least one example. The process 1800 may be performed at least in part by the calibration engine 204, whether embodied in the aerial vehicle 106, the aerial vehicle management system 1302, some other computing device, or some combination of the foregoing.

The process 1800 begins at 1802 by providing an augmented reality interface at a transparent display of a head-mounted wearable device that is worn by a user.

At 1804, the process 1800 provides, for presentation at the augmented reality interface, directions for the user to present a calibration target to a camera or based on other data. In some examples, the directions may include one or more three-dimensional indicia presented on the transparent display. In some examples, the calibration target may include a pattern that is attached to the head-mounted wearable device, attached to a first article worn by the user other than the head-mounted wearable device, or attached to a second article held by the user. In some examples, the calibration target may include an updatable pattern that automatically updates based at least in part on a distance between the head-mounted wearable device and the camera. In some examples, the pattern may include a set of lighting elements.

In this example, each lighting element may be independently controllable with respect to each other. In some examples, the directions for the user may include directions for the user to inspect one or more systems of an unmanned aerial vehicle to which the camera is attached.

At 1806, the process 1800 receives, from the camera, calibration data collected by the camera viewing the calibration target when the user presents the calibration target at the camera.

At 1808, the process 1800 accesses existing calibration data for the camera. In some examples, the calibration data may include a smaller quantity of data than the existing calibration data.

At 1810, the process 1800 validates the existing calibration data with respect to the camera based at least in part on the calibration data.

In some examples, the camera may be one of a plurality of cameras attached to an unmanned aerial vehicle. In this example, the process 1800 may further include receiving, from a second camera, second calibration data collected by the second camera viewing the calibration target when the user presents the calibration target at the second camera. The process 1800 may further include accessing second existing calibration data for the second camera. The process 1800 may further include validating the second existing calibration data with respect to the second camera based at least in part on the second calibration data.

In some examples, the process 1800 may further include providing, for presentation at the augmented reality interface, a three-dimensional indicia that identifies the camera.

Figure 19:
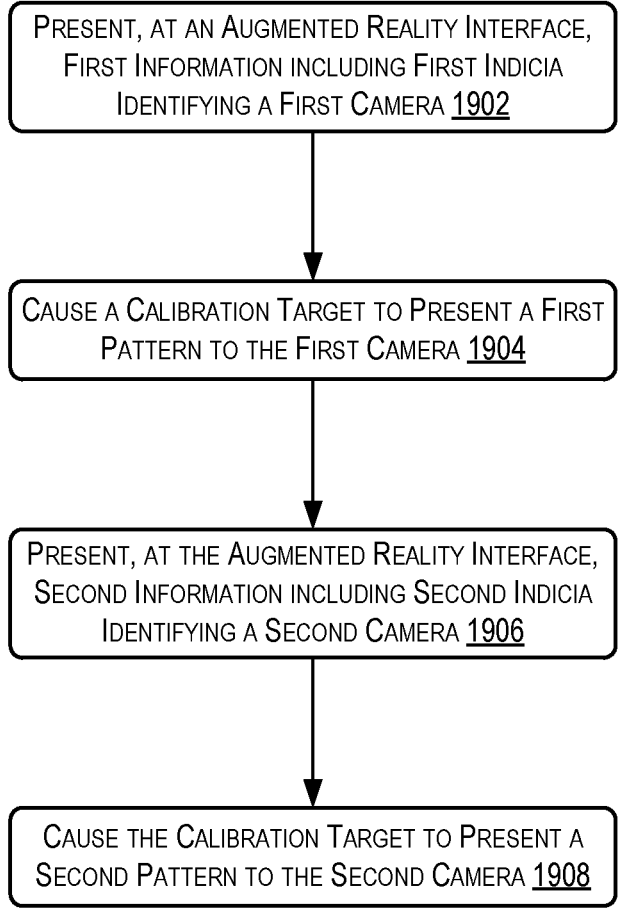
FIG. 19 illustrates an example flow diagram depicting example acts for implementing techniques relating to camera calibration using a wearable head-mounted device and a moveable calibration target, according to at least one example.

FIG. 19 illustrates the process 1900 depicting example acts for implementing techniques relating to camera calibration using a wearable head-mounted device and a moveable calibration target, according to at least one example. The process 1900 may be performed at least in part by the calibration engine 204, whether embodied in the aerial vehicle 106, the aerial vehicle management system 1302, some other computing device, or some combination of the foregoing.

The process 1900 begins at 1902 by presenting, at an augmented reality interface, first information including first indicia identifying a first camera. The first camera may be attached to an unmanned aerial vehicle.

At 1904, the process 1900 causes a calibration target to present a first pattern to the first camera. This may include presenting when a wearable device that includes the augmented reality interface is disposed at a first position with respect to the first camera. In some examples, the first pattern is one of a plurality of updatable patterns. The updatable pattern may include a set of lighting elements. In some examples, each lighting element may be independently controllable with respect to each other.

At 1906, the process 1900 presents, at the augmented reality interface, second information including second indicia identifying a second camera. The second camera may be attached to the unmanned aerial vehicle. In some examples, the first position may be located a first distance from the first camera and the second position may be located at a second distance from the second camera. In some examples, the first camera and the second camera may be held at fixed locations and the wearable device is moved by a user with respect to the first camera and the second camera.

At 1908, the process 1900 causes the calibration target to present a second pattern to the second camera. This may include presenting the second pattern when the wearable device is disposed at a second position with respect to the second camera. In some examples, detection of the first pattern by the first camera and detection of the second pattern by the second camera enables a remote computing device to validate an existing calibration of the first camera and the second camera.

In some examples, the augmented reality interface may be presented at transparent display of a wearable device. The transparent display may be configured such that the first camera and the second camera are visible through the transparent display and the first indicia is presented as virtual information on the transparent display in relation to the visible first camera and the visible second camera.

Figure 20:
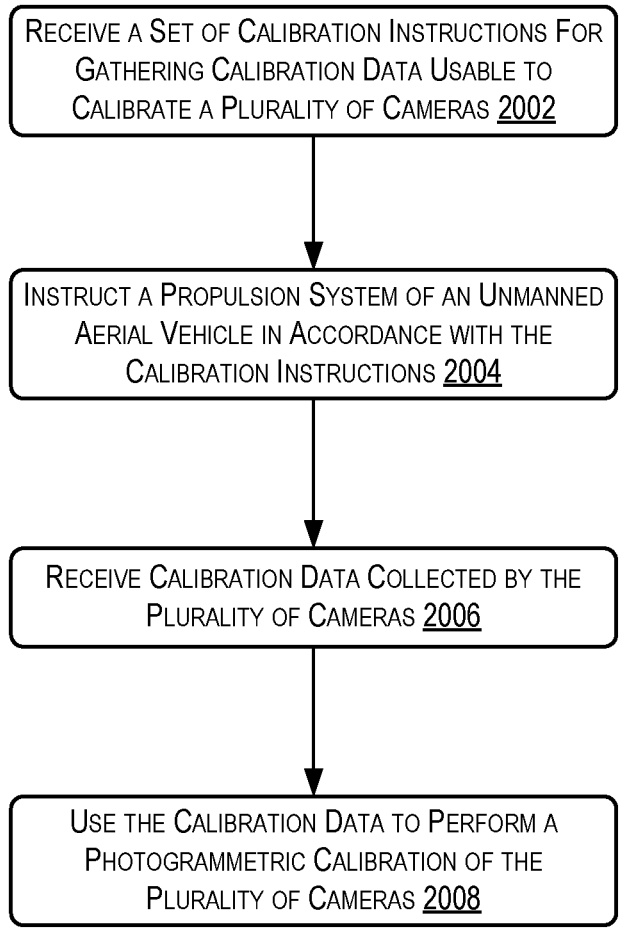
FIG. 20 illustrates an example flow diagram depicting example acts for implementing techniques relating to camera calibration using one or more fixed calibration targets, according to at least one example.

FIG. 20 illustrates the process 2000 depicting example acts for implementing techniques relating to camera calibration using one or more fixed calibration targets, according to at least one example. The process 2000 may be performed at least in part by the calibration engine 204, whether embodied in the aerial vehicle 106, the aerial vehicle management system 1302, some other computing device, or some combination of the foregoing.

The process 2000 begins at 2002 by receiving a set of calibration instructions for gathering calibration data usable to calibrate a plurality of cameras. The plurality of cameras may be attached to an unmanned aerial vehicle. In some examples, the set of calibration instructions may include navigational instructions for the unmanned aerial vehicle to fly with respect to a set of fixed calibration targets such that individual cameras of the plurality of cameras are presented to individual fixed calibration targets at predefined distances and at predefined orientations. In some examples, the plurality of cameras may be part of a sense and avoid system of the unmanned aerial vehicle. In some examples, each fixed calibration target may include a calibration pattern that is recognizable by the plurality of cameras. In some examples, the set of fixed calibration targets may be disposed at various elevations with respect to each other and may be of various sizes with respect to each other.

At 2004, the process 2000 instructs a propulsion system of the unmanned aerial vehicle to propel the unmanned aerial vehicle in accordance with the calibration instructions.

At 2006, the process 2000 receives calibration data collected by the plurality of cameras. This may include the plurality of cameras viewing the set of fixed calibration targets while the propulsion system propels the unmanned aerial vehicle in accordance with the set of calibration instructions.

At 2008, the process 2000 uses the calibration data to perform a photogrammetric calibration of the plurality of cameras.

In some examples, the process 2000 may further include receiving an error message that at least one camera of the plurality of cameras requires calibration. For example, the error message may indicate that the at least one camera lacks sufficient calibration data. In this example, instructing the propulsion system to propel the unmanned aerial vehicle in accordance with the navigational instructions may be performed in response to receiving the error message.

In some examples, the unmanned aerial vehicle may include a calibration mode. In this example, instructing the propulsion system to propel the unmanned aerial vehicle may include instructing the propulsion system to propel the unmanned aerial vehicle in accordance with the navigational instructions when the calibration mode is activated. In some examples, the calibration mode may be activated when the unmanned aerial vehicle approaches a field of calibration targets.

Figure 21:
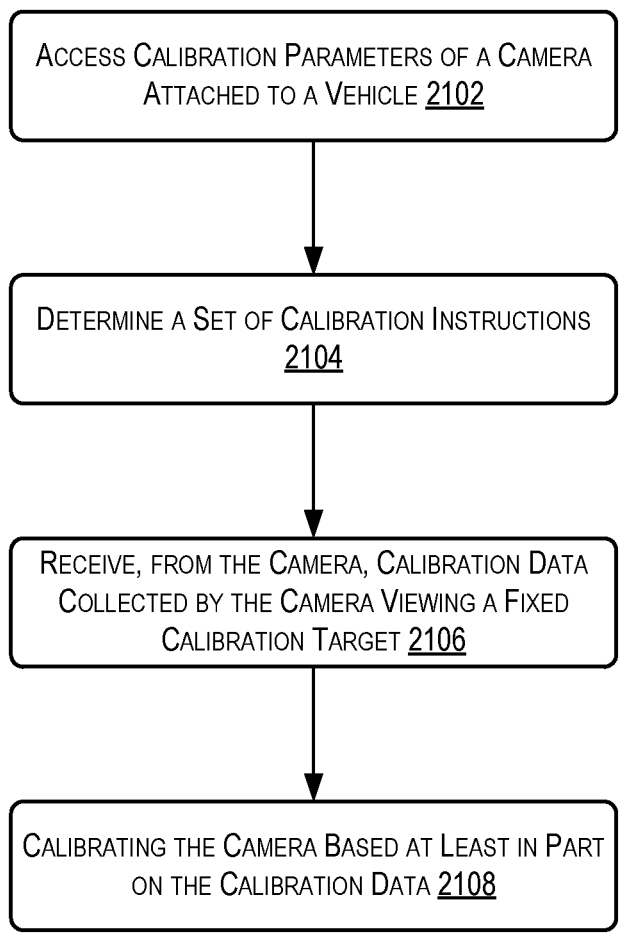
FIG. 21 illustrates an example flow diagram depicting example acts for implementing techniques relating to camera calibration using one or more fixed calibration targets, according to at least one example.

FIG. 21 illustrates the process 2100 depicting example acts for implementing techniques relating to camera calibration using one or more fixed calibration targets, according to at least one example. The process 2100 may be performed at least in part by the calibration engine 204, whether embodied in the aerial vehicle 106, the aerial vehicle management system 1302, some other computing device, or some combination of the foregoing.

The process 2100 begins at 2102 by accessing calibration parameters of a camera that is attached to a vehicle. The calibration parameters may include internal parameters of the camera, mounting parameters defining an orientation and position of the camera with respect to other cameras and/or a fixed point of reference, any other suitable parameter relevant to camera calibration techniques. In some examples, the camera may be usable by the vehicle for navigation of the vehicle. In some examples, the vehicle may be an unmanned aerial vehicle. In this example, the camera may be one of a plurality of cameras attached to a frame of the unmanned aerial vehicle.

At 2104, the process 2100 determines a set of calibration instructions. Determining the set of calibration instructions may be based at least in part on the calibration parameters. In some examples, the set of calibration instructions may include navigational instructions for the vehicle to follow to present the camera to a fixed calibration target. In some examples, the navigational instructions may include instructions for the vehicle to follow to present the camera to the fixed calibration target at one or more predefined angles and at one or more predefined orientations. In some examples, the navigational instructions may include instructions for the vehicle (e.g., an unmanned aerial vehicle) to rotate about a rotational axis of the unmanned aerial vehicle so as to rotationally present the plurality of cameras to the fixed calibration target. In some examples, the navigational instructions may define a path for the vehicle to follow to present the camera to the fixed calibration target. In this example, the path may overlap with a route that the vehicle commonly follows. In some examples, the vehicle may be an unmanned aerial vehicle configured to transport items between a home station and a plurality of customers. In this example, the route may be a transportation route followed by the unmanned aerial vehicle when leaving the home station or when returning to the home station.

At 2106, the process 2100 may include receiving, from the camera, calibration data collected by the camera viewing a fixed calibration target. The camera may view the calibration target as a result of the vehicle navigating in accordance with the navigational instructions. In some examples, receiving the calibration data may include receiving the calibration data at least until a calibration data threshold is fulfilled. In this example, the vehicle may navigate in accordance with the navigational instructions at least until the calibration data threshold is fulfilled.

In some examples, the fixed calibration target may be one of a plurality of fixed targets. For example, each fixed target of the plurality of fixed targets may be fixed at a various position and at a various orientation with respect to each other. In an additional example, each fixed target of the plurality of fixed targets may be disposed at a various elevation with respect to each other and is of a various size with respect to each other.

At 2108, the process 2100 calibrates the camera based at least in part on the calibration data.

Figure 22:
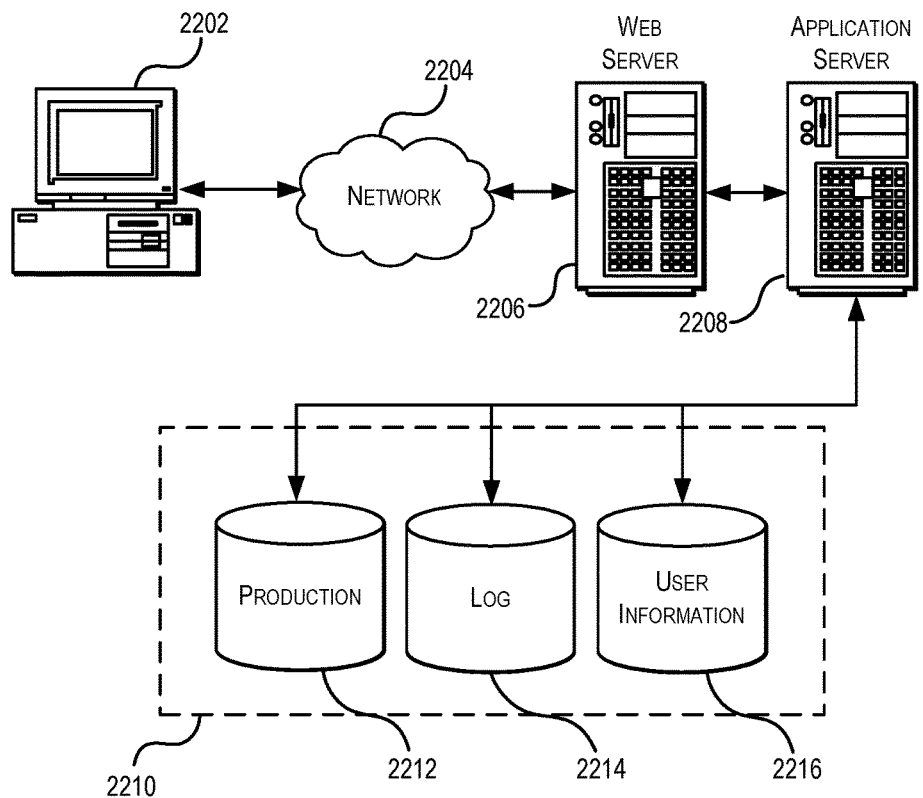
FIG. 22 illustrates an environment in which various examples can be implemented.

FIG. 22 illustrates aspects of an example environment 2200 for implementing aspects in accordance with various examples. As will be appreciated, although a Web-based environment is used for purposes of explanation, different environments may be used, as appropriate, to implement various examples. The environment includes an electronic client device 2202, which can include any appropriate device operable to send and receive requests, messages, or information over an appropriate network 2204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well-known and will not be discussed herein in detail. Communication over the network can be enabled by wired or wireless connections and combinations thereof. In this example, the network includes the Internet, as the environment includes a Web server 2206 for receiving requests and serving content in response thereto, although for other networks an alternative device serving a similar purpose could be used as would be apparent to one of ordinary skill in the art.

The illustrative environment includes at least one application server 2208 and a data store 2210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 2202 and the application server 2208, can be handled by the Web server. It should be understood that the Web and application servers are not required and are merely example components, as structured code discussed herein can be executed on any appropriate device or host machine as discussed elsewhere herein.

The data store 2210 can include several separate data tables, databases or other data storage mechanisms and media for storing data relating to a particular aspect. For example, the data store illustrated includes mechanisms for storing production data 2212 and user information 2216, which can be used to serve content for the production side. The data store also is shown to include a mechanism for storing log data 2214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 2210. The data store 2210 is operable, through logic associated therewith, to receive instructions from the application server 2208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 2202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 22. Thus, the depiction of the environment 2200 in FIG. 22 should be taken as being illustrative in nature and not limiting to the scope of the disclosure.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk ("DVD"), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    an unmanned aerial vehicle comprising a plurality of cameras;
    a head-mounted wearable device comprising a transparent display through which physical objects of a physical, real-world environment are visible and on which is presented virtual information in relation to the physical objects; and
    a computing device in communication with the plurality of cameras and the head-mounted wearable device, the computing device configured to:
        provide an augmented reality interface at the transparent display of the head-mounted wearable device;
        provide, at the augmented reality interface, a representation of a field of view of a first camera of the plurality of cameras, the representation comprising first three-dimensional virtual information indicating a first area within the field of view for collection of calibration data, the three-dimensional virtual information representative of a three-dimensional point cloud satisfied by collection of the calibration data without regard to a predefined order;
        provide, at the augmented reality interface, a first three-dimensional point cloud for a user wearing the head-mounted wearable device to move a calibration target within the field of view of the first camera for collection of the calibration data;
        after the user has moved the calibration target within the field of view, receive first calibration data collected by the first camera viewing the calibration target within the field of view;
        provide, at the augmented reality interface, a second three-dimensional point cloud for the user wearing the head-mounted wearable device to adjust at least one of a position of the calibration target with respect to the first camera or an orientation of the calibration target with respect to the first camera;
        after the user has adjusted at least one of the position or the orientation of the calibration target, receive second calibration data collected by the first camera viewing the calibration target within the field of view; and
        use the first calibration data and the second calibration data to perform a photogrammetric calibration of the first camera.

2. The system of claim 1, wherein the representation comprises second three-dimensional virtual information indicating a second area within the field of view where the calibration data has previously been collected.

3. The system of claim 1, wherein the first three-dimensional point cloud comprises an unsatisfied portion and collection of the calibration data by the first camera satisfies the unsatisfied portion of the first three-dimensional point cloud.

4. The system of claim 1, wherein the computing device is further configured to provide, at the augmented reality interface, a second representation of the field of view of the first camera, the second representation comprising second three-dimensional virtual information, comprising the second three-dimensional point cloud indicating successful collection of the calibration data in the first area within the field of view.

5. A computer-implemented method, comprising:
    providing an augmented reality interface at a transparent display of a head-mounted wearable device that is worn by a user;
    providing, for presentation at the augmented reality interface, three-dimensional virtual information identifying a portion of a field of view of a remote camera that is associated with collection of calibration data for the remote camera, the three-dimensional virtual information representative of a three-dimensional point cloud satisfied by collection of the calibration data without regard to a predefined order;
    receiving, from the remote camera, calibration data collected by the remote camera viewing a calibration target associated with the user within the field of view, a position and an orientation of the calibration target with respect to the remote camera changed by the user when the calibration target is within the field of view; and
    calibrating the remote camera based at least in part on the calibration data.

6. The computer-implemented method of claim 5, wherein the three-dimensional point cloud comprises: first indicia identifying a first three-dimensional portion of the point cloud that is satisfied; and second indicia identifying a second three-dimensional portion of the point cloud that is unsatisfied.

7. The computer-implemented method of claim 5, wherein the three-dimensional virtual information comprises directions for the user wearing the head-mounted wearable device to move the calibration target within the field of view such that the remote camera can collect the calibration data.

8. The computer-implemented method of claim 5, wherein the three-dimensional virtual information comprises a three-dimensional ghost representation of the calibration target, alignment of the calibration target with the three-dimensional ghost representation causing a state change of the three-dimensional ghost representation.

9. The computer-implemented method of claim 5, wherein: the calibration data is first calibration data and the position is a first position; the method further comprises receiving, from the remote camera, second calibration data collected by the remote camera viewing the calibration target when the calibration target is located at a second position within the field of view; and calibrating the remote camera is further based at least in part on the second calibration data.

10. The computer-implemented method of claim 5, wherein the remote camera is one of a set of remote cameras, the three-dimensional virtual information identifying a second portion of a second field of view of the remote camera that is associated with collection of the calibration data for the remote camera.

11. The computer-implemented method of claim 5, wherein the remote camera is attached to an aerial vehicle and the calibration target comprises a handheld object comprising a calibration pattern.

12. The computer-implemented method of claim 11, wherein: providing the augmented reality interface comprises providing by an onboard computing device of the aerial vehicle; providing the three-dimensional virtual information comprises providing by the onboard computing device; and calibrating the remote camera comprises calibrating by the onboard computing device.

13. The computer-implemented method of claim 5, wherein the three-dimensional point cloud comprises one or more updatable points, each point updatable to change one or more properties of color, visibility, shape, intrusiveness, contrast, or flashing.

14. The computer-implemented method of claim 5, wherein the calibration target is updatable and comprises an updatable pattern.

15. The computer-implemented method of claim 14, wherein the updatable pattern automatically updates based at least in part on one or more of a distance between the head-mounted wearable device and the camera, a resolution value of the camera, a lens type of the camera, a camera type of the camera, or an orientation of the camera.

16. A wearable device, comprising:
a transparent display at which is presented an augmented reality interface; and
a computing device configured to communicate with a remote computing device, the computing device configured to:
present first information at the augmented reality interface, the first information comprising first indicia identifying a first area within a field of view of a remote camera where calibration data for calibrating the remote camera is insufficient;
present second information at the augmented reality interface, the second information comprising second indicia identifying a second area within the field of view of the remote camera where the calibration data for calibrating the remote camera is sufficient; and
after the wearable device has moved into the first area, present third information at the augmented reality interface, the third information comprising third indicia indicating that the calibration data in the first area is sufficient, wherein at least one of the first information, second information, or third information comprises a three-dimensional point cloud that is satisfied by collection of the calibration data without regard to a predefined order.

17. The wearable device of claim 16, wherein the transparent display is configured such that physical objects of a physical, real-world environment are visible through the transparent display and virtual information is presented on the transparent display in relation to the physical objects.

18. The wearable device of claim 16, wherein the second indicia and the third indicia are the same.

19. The wearable device of claim 16, wherein: the first indicia identify a particular point in a physical, real-world environment within the first area; and the computing device is further configured to present fourth information at the augmented reality interface, the fourth information comprising fourth indicia directing a user wearing the wearable device to move a calibration target to the particular point in the physical, real-world environment.

20. The wearable device of claim 16, wherein the remote camera is held at a fixed location and the wearable device is moved by a user with respect to the remote camera.

* * * * *